(12) United States Patent
Li

(10) Patent No.: US 10,298,351 B2
(45) Date of Patent: May 21, 2019

(54) METHOD FOR IMPLEMENTING HYBRID AUTOMATIC REPEAT REQUEST, USER EQUIPMENT, AND BASE STATION

(71) Applicant: Huawei Device Co., Ltd., Dongguan (CN)

(72) Inventor: Yingyang Li, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 22 days.

(21) Appl. No.: 14/142,576

(22) Filed: Dec. 27, 2013

(65) Prior Publication Data

US 2014/0112218 A1     Apr. 24, 2014

Related U.S. Application Data

(63) Continuation of application No. PCT/CN2013/070274, filed on Jan. 9, 2013.

(30) Foreign Application Priority Data

Jan. 9, 2012   (CN) .......................... 2012 1 0004785

(51) Int. Cl.
*H04J 3/16* (2006.01)
*H04L 1/16* (2006.01)
(Continued)

(52) U.S. Cl.
CPC .......... *H04J 3/1694* (2013.01); *H04L 1/1607* (2013.01); *H04L 5/001* (2013.01); *H04L 5/0055* (2013.01); *H04L 5/1469* (2013.01)

(58) Field of Classification Search
CPC ....... H04L 1/00; H04L 1/0079; H04L 1/0067; H04L 5/001; H04L 5/0055; H04L 5/1469; H04J 3/1694
See application file for complete search history.

(56) References Cited

U.S. PATENT DOCUMENTS

2009/0279458 A1   11/2009  Shen et al.
2010/0172428 A1*   7/2010  Pani et al. ................ 375/262
(Continued)

FOREIGN PATENT DOCUMENTS

CN   101350946 A   1/2009
CN   101404526 A   4/2009
(Continued)

OTHER PUBLICATIONS

"3$^{rd}$ Generation Partnership Project; Technical Specification Group Radio Access Network; Evolved Universal Terrestrial Radio Access (E-URTA); Physical layer procedures (Release 10)," 3GPP TS 36.213, V10.12.0, pp. 1-127, 3$^{rd}$ Generation Partnership Project, Valbonne, France (Mar. 2014).

(Continued)

*Primary Examiner* — Ricky Q Ngo
*Assistant Examiner* — Stephen N Steiner
(74) *Attorney, Agent, or Firm* — Leydig, Voit & Mayer, Ltd.

(57) ABSTRACT

Embodiments of the present invention provide a method for implementing hybrid automatic repeat request, a user equipment, and a base station. The method includes: determining first indication information and second indication information separately according to feedback information of each downlink subframe of a primary cell and that of a secondary cell that need to be sent in a same uplink subframe of the primary cell, where the first indication information is used to indicate first feedback information of each downlink subframe of the primary cell that needs to be sent in the uplink subframe, and the second indication information is used to indicate second feedback information of each downlink subframe of the secondary cell that needs to be sent in the uplink subframe; sending mapping information of the first (Continued)

indication information and the second indication information in the uplink subframe.

3 Claims, 8 Drawing Sheets

(51) Int. Cl.
*H04L 5/00* (2006.01)
*H04L 5/14* (2006.01)

(56) References Cited

U.S. PATENT DOCUMENTS

| | | | |
|---|---|---|---|
| 2010/0210256 A1* | 8/2010 | Shen | H04L 1/1614 455/422.1 |
| 2010/0272048 A1* | 10/2010 | Pan et al. | 370/329 |
| 2011/0116455 A1* | 5/2011 | Damnjanovic et al. | 370/329 |
| 2011/0243066 A1* | 10/2011 | Nayeb Nazar et al. | 370/328 |
| 2011/0249578 A1 | 10/2011 | Nayeb Nazar et al. | |
| 2011/0268059 A1 | 11/2011 | Li et al. | |
| 2012/0087254 A1* | 4/2012 | Yin | H04L 1/0031 370/252 |
| 2012/0134305 A1* | 5/2012 | Damnjanovic | H04L 1/1607 370/280 |
| 2013/0114575 A1* | 5/2013 | Fu | H04L 5/0053 370/336 |
| 2014/0022967 A1* | 1/2014 | Yang | H04L 1/1861 370/280 |
| 2014/0036742 A1* | 2/2014 | Charbit | H04W 52/0235 370/280 |

FOREIGN PATENT DOCUMENTS

| | | |
|---|---|---|
| CN | 101951684 A | 1/2011 |
| CN | 101989897 A | 3/2011 |
| CN | 102308636 A | 1/2012 |
| CN | 102820960 A | 12/2012 |
| WO | WO 2007045279 A1 | 4/2007 |
| WO | WO 2011100646 A1 | 8/2011 |

OTHER PUBLICATIONS

"3$^{rd}$ Generation Partnership Project; Technical Specification Group Radio Access Network; Evolved Universal Terrestrial Radio Access (E-UTRA); Physical layer procedures (Release 9)," 3GPP TS 36.213, V9.3.0, pp. 1-80, 3$^{rd}$ Generation Partnership Project, Valbonne, France (Sep. 2010).

"3$^{rd}$ Generation Partnership Project; Technical Specification Group Radio Access Network; Evolved Universal Terrestrial Radio Access (E-UTRA); Physical layer procedures (Release 11)," 3GPP TS 36.213 V11.7.0, pp. 1-182, 3$^{rd}$ Generation Partnership Project, Valbonne, France (Jun. 2014).

"3$^{rd}$ Generation Partnership Project; Technical Specification Group Radio Access Network; Evolved Universal Terrestrial Radio Access (E-UTRA); Physical layer procedures (Release 8)," 3GPP TS 36.213, V8.8.0, pp. 1-77, 3$^{rd}$ Generation Partnership Project, Valbonne, France (Sep. 2009).

"HARQ-ACK Coding for DL CA with TDD," 3GPP TSG RAN WG1 #63, Jacksonville, Florida, R1-106014, 3$^{rd}$ Generation Partnership Project, Valbonne, France (Nov. 15-19, 2010).

* cited by examiner

METHOD FOR IMPLEMENTING HYBRID AUTOMATIC REPEAT REQUEST, USER EQUIPMENT, AND BASE STATION

CROSS-REFERENCE TO RELATED APPLICATIONS

This application is a continuation of international Patent Application No. PCT/CN2013/070274, filed on Jan. 9, 2013, which claims priority to Chinese Patent Application No. 201210004785.0, filed on Jan. 9, 2012, both of which are hereby incorporated by reference in their entireties.

TECHNICAL FIELD

Embodiments of the present invention relate to the field of communications technologies, and in particular, to a method for implementing hybrid automatic repeat request, a user equipment, and a base station.

BACKGROUND

In an LTE (Long Term Evolution, Long Term Evolution) TDD (Time Division Duplexing, time division duplexing) system, due to asymmetry of uplink and downlink, when there are more downlink subframes than uplink subframes, feedback information (for example, ACK or NACK information) of a plurality of downlink subframes is sent together in a same uplink subframe. Here, downlink subframes whose feedback information is sent in a same uplink subframe are referred to as a binding window.

A CA (Carrier Aggregation, carrier aggregation) technology is introduced in LTE release 10. Each cell where the CA technology is adopted adopts the same TDD uplink and downlink configuration. Therefore, each cell can work according to a HARQ (Hybrid Automatic Repeat reQuest, hybrid automatic repeat request) timing relationship of the TDD uplink and downlink configuration defined in LTE release 8. LTE release 10 specifies that feedback information of a PDSCH (Physical Downlink Shared Channel, physical downlink shared channel) of each cell is sent by a primary cell (PCell), which ensures the single-carrier characteristic for an uplink signal and also simplifies power control on the uplink signal. As all cells adopt the same TDD uplink and downlink configuration, within a same uplink subframe, the number of subframes whose feedback information needs to be sent by a primary cell is the same as the number of subframes whose feedback information needs to be sent by a secondary cell (SCell). Therefore, a same method may be adopted to process feedback information of each cell, so as to send the feedback information based on a channel selection mapping table.

In LTE release 11, the problem that a TDD system coexists with an existing system in each frequency band and requirements such as a heterogeneous network are considered, and a processing method for a case that a plurality of cells adopting the CA technology have different uplink and downlink configurations needs to be researched. In other words, in LTE release 11, within a same uplink subframe, the number of subframes whose feedback information needs to be sent by a primary cell may be unequal to the number of subframes whose feedback information needs to be sent by a secondary cell. Therefore, how to send feedback information when a plurality of cells adopting the CA technology have different uplink and downlink configurations is an urgent problem to be solved.

SUMMARY

Embodiments of the present invention provide a method for implementing hybrid automatic repeat request, a user equipment, and a base station, so as to implement sending feedback information when a plurality of cells adopting the CA technology have different uplink and downlink configurations.

An aspect provides a method for implementing hybrid automatic repeat request, which includes: determining first indication information and second indication information separately according to feedback information of each downlink subframe of a primary cell and that of a secondary cell that need to be sent in a same uplink subframe of the primary cell, where the first indication information is used to indicate first feedback information of each downlink subframe of the primary cell that needs to be sent in the uplink subframe, and the second indication information is used to indicate second feedback information of each downlink subframe of the secondary cell that needs to be sent in the uplink subframe; and sending mapping information of the first indication information and the second indication information in the uplink subframe, where an uplink and downlink configuration adopted by the primary cell is different from that adopted by the secondary cell.

Another aspect provides a method for implementing hybrid automatic repeat request, which includes: receiving mapping information of first indication information and second indication information sent by a user equipment in a same uplink subframe of a primary cell, where the first indication information is used to indicate first feedback information of each downlink subframe of the primary cell that needs to be sent in the uplink subframe, and the second indication information is used to indicate second feedback information of each downlink subframe of a secondary cell that needs to be sent in the uplink subframe; determining the first indication information and the second indication information according to the mapping information; and determining the first feedback information according to the first indication information, and determining the second feedback information according to the second indication information, where an uplink and downlink configuration adopted by the primary cell is different from that adopted by the secondary cell.

Another aspect provides a user equipment, which includes: a processor, configured to: separately according to feedback information of each downlink subframe of a primary cell and that of a secondary cell that need to be sent in a same uplink subframe of the primary cell, determine first indication information used to indicate first feedback information of each downlink subframe of the primary cell that needs to be sent in the uplink subframe and second indication information used to indicate second feedback information of each downlink subframe of the secondary cell that needs to be sent in the uplink subframe; and a sender, configured to send mapping information of the first indication information and the second indication information in the uplink subframe, where an uplink and downlink configuration adopted by the primary cell is different from that adopted by the secondary cell.

Another aspect provides a base station, which includes: a receiver, configured to receive mapping information of first indication information and second indication information sent by a user equipment in a same uplink subframe of a primary cell, where the first indication information is used to indicate first feedback information of each downlink subframe of the primary cell that needs to be sent in the uplink subframe, and the second indication information is used to indicate second feedback information of each downlink subframe of a secondary cell that needs to be sent in the uplink subframe; and a processor, configured to determine the first indication information and the second indication information according to the mapping information, determine the first feedback information according to the first indication information, and determine the second feedback information according to the second indication information, where an uplink and downlink configuration adopted by the primary cell is different from that adopted by the secondary cell.

Another aspect provides a method for implementing hybrid automatic repeat request, which includes: performing filling on feedback information for a primary cell and/or a secondary cell whose feedback information needs to be sent in a same uplink subframe of the primary cell, so that the primary cell and the secondary cell both have feedback information corresponding to the first number of downlink subframes to send in the uplink subframe; determining first indication information used to indicate feedback information of each downlink subframe of the primary cell that needs to be sent in the uplink subframe and second indication information used to indicate feedback information of each downlink subframe of the secondary cell that needs to be sent in the uplink subframe according to the feedback information corresponding to the first number of downlink subframes of the primary cell and the secondary cell; and sending mapping information of the first indication information and the second indication information in the uplink subframe, where an uplink and downlink configuration adopted by the primary cell is different from that adopted by the secondary cell.

Another aspect provides a method for implementing hybrid automatic repeat request, which includes: receiving mapping information of first indication information and second indication information in a same uplink subframe of a primary cell; obtaining the first indication information and the second indication information according to the mapping information; determining feedback information corresponding to the first number of downlink subframes of the primary cell according to the first indication information, determining feedback information corresponding to the first number of downlink subframes of a secondary cell according to the second indication information, removing filled information from the feedback information corresponding to the first number of downlink subframes of the primary cell according to the number of feedback information bits of the primary cell that needs to be sent in the uplink subframe and the first number, so as to determine the feedback information of the primary cell that needs to be sent in the uplink subframe, and/or removing filled information from the feedback information corresponding to the first number of downlink subframes of the secondary cell according to the number of feedback information bits of the secondary cell that needs to be sent in the uplink subframe and the first number, so as to determine the feedback information of the secondary cell that needs to be sent in the uplink subframe.

Another aspect provides a user equipment, which includes: a processor, configured to perform filling on feedback information for a primary cell and/or a secondary cell whose feedback information needs to be sent in a same uplink subframe of the primary cell, so that the primary cell and the secondary cell both have feedback information corresponding to the first number of downlink subframes to send in the uplink subframe; and determine first indication information used to indicate feedback information of each downlink subframe of the primary cell that needs to be sent in the uplink subframe and second indication information used to indicate feedback information of each downlink subframe of the secondary cell that needs to be sent in the uplink subframe according to the feedback information corresponding to the first number of downlink subframes of the primary cell and the secondary cell; and a sender, configured to send mapping information of the first indication information and the second indication information in the uplink subframe, where an uplink and downlink configuration adopted by the primary cell is different from that adopted by the secondary cell.

Another aspect provides a base station, which includes: a receiver, configured to receive mapping information of first indication information and second indication information in a same uplink subframe of a primary cell; a processor, configured to obtain the first indication information and the second indication information according to the mapping information; determine feedback information corresponding to the first number of downlink subframes of the primary cell according to the first indication information, determine feedback information corresponding to the first number of downlink subframes of a secondary cell according to the second indication information, remove filled information from the feedback information corresponding to the first number of downlink subframes of the primary cell according to the number of feedback information bits of the primary cell that needs to be sent in the uplink subframe and the first number, so as to determine the feedback information of the primary cell that needs to be sent in the uplink subframe, and/or remove filled information from the feedback information corresponding to the first number of downlink subframes of the secondary cell according to the number of feedback information bits of the secondary cell that needs to be sent in the uplink subframe and the first number, so as to determine the feedback information of the secondary cell that needs to be sent in the uplink subframe.

Another aspect provides a communications system, which includes: the foregoing user equipment and the foregoing base station.

The technical solutions can separately process feedback information sent in a same uplink subframe of a primary cell and by a plurality of cells adopting different uplink and downlink configurations, and send mapping information of indication information obtained after processing in the uplink subframe, so as to implement sending feedback information when the cells have different uplink and downlink configurations.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1A:
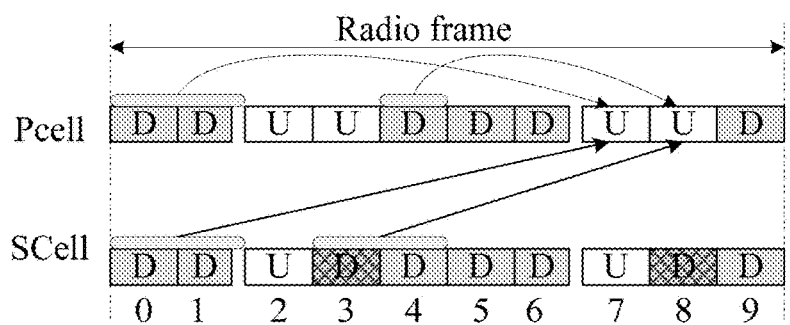
FIG. 1A to FIG. 1D are schematic diagrams of a timing relationship of feedback information of a primary cell and a secondary cell.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solution of the present invention is applicable to various communications systems such as a GSM (Global System for Mobile communication, Global System for Mobile Communications) system, a CDMA (Code Division Multiple Access, Code Division Multiple Access) system, a WCDMA (Wideband Code Division Multiple Access, Wideband Code Division Multiple Access) system, a GPRS (General Packet Radio Service, General Packet Wireless Service), an LTE (Long Term Evolution, Long Term Evolution) system, an LTE-A (Long Term Evolution Advanced, Long Term Evolution Advanced) system, a UMTS (Universal Mobile Telecommunications System, Universal Mobile Telecommunications System), which are not limited in the embodiments of the present invention. However, for ease of description, an LTE network is used as an example in the embodiments of the present invention for description.

Embodiments of the present invention are applicable to wireless networks of different standards. In different systems, a radio access network may include different network elements. For example, network elements in a radio access network of LTE and LTE-A include an eNB (eNodeB, evolved NodeB). Network elements in a radio access network of WCDMA include an RNC (Radio Network Controller, radio network controller) and a NodeB. Similarly, solutions similar to those in the embodiments of the present invention may also be used in other wireless networks such as WiMAX (Worldwide Interoperability for Microwave Access, Worldwide Interoperability for Microwave Access), and only related modules in a base station system might be different, which are not limited in the embodiments of the present invention. However, for ease of description, an eNodeB is used as an example for description in the following embodiments.

It should be further understood that, in embodiments of the present invention, a user equipment (UE, User Equipment) includes, but is not limited to, a mobile station (MS, Mobile Station), a mobile terminal (Mobile Terminal), a mobile telephone (Mobile Telephone), a handset (handset), and a portable equipment (portable equipment). The user equipment may communicate with one or more core networks by using a radio access network (RAN, Radio Access Network). For example, a user equipment may be a mobile telephone (or referred to as a "cellular" phone), a computer having a wireless communications function, and the like. The user equipment may further be a portable, pocket, handheld, computer built-in or vehicle-mounted mobile device.

In LTE release 10, according to the size M of a binding window, the method based on channel selection may have different specific forms. For example, when M equals 2, after space of each downlink subframe is bound, two cells obtain a maximum of 4 binding feedback information bits in total and can directly work according to a 4-bit channel selection mapping table. Here, space binding means to compress feedback information of a plurality of (for example, two) code words of each downlink subframe into 1 bit. When M equals 3 or 4, because the number of feedback information bits obtained by two cells after space binding is performed on each downlink subframe is still greater than 4 bits, a time binding method is further adopted to compress the feedback information of each cell into 2 bits. Table 1 and Table 2 show time binding methods (time binding tables) for processing when M equals 3 and 4 defined in LTE release 10. In LTE release 10, a 4-bit channel selection mapping table shown in Table 3 is adopted.

TABLE 1

| HARQ-ACK (0), HARQ-ACK (1), HARQ-ACK (2) | Mapped 2 bits |
| --- | --- |
| ACK, ACK, ACK | A, A |
| ACK, ACK, NACK/DTX | N/D, A |
| ACK, NACK/DTX, any | A, N/D |
| NACK, any, any | N, N/D |
| DTX, any, any | D, N/D |

TABLE 2

| HARQ-ACK (0), HARQ-ACK (1), HARQ-ACK (2), HARQ-ACK (3) | Mapped 2 bits |
| --- | --- |
| 'A, A, A, N/D' | A, A |
| 'A, A, N/D, any' | N/D, A |
| 'A, D, D, D' or 'A, A, A, A' | A, N/D |
| 'N, any, any, any' or 'A, D/N, any, any except for A, D, D, D' | N, N/D |
| 'D, any, any, any' | D, N/D |

The feedback information inside the binding window of each cell can be compressed into two bits by using Table 1 and Table 2. Accordingly, two cells can obtain 4 bits. Next, for the 4 bits after compression, 2 bits of the primary cell are mapped to HARQ-ACK (0) and HARQ-ACK (1), and 2 bits of the secondary cell are mapped to ARQ-ACK (2) and HARQ-ACK (3), so as to send feedback information by using the channel selection mapping table in Table 3.

TABLE 3

| HARQ-ACK (0), HARQ-ACK (1), HARQ-ACK (2), HARQ-ACK (3) | nPUCCH | b0, b1 |
|---|---|---|
| ACK, ACK, ACK, ACK | nPUCCH_1 | 1, 1 |
| ACK, ACK, ACK, NACK/DTX | nPUCCH_2 | 1, 1 |
| ACK, ACK, NACK/DTX, ACK | nPUCCH_0 | 1, 0 |
| ACK, ACK, NACK/DTX, NACK/DTX | nPUCCH_1 | 1, 0 |
| ACK, NACK/DTX, ACK, ACK | nPUCCH_3 | 1, 1 |
| ACK, NACK/DTX, ACK, NACK/DTX | nPUCCH_2 | 1, 0 |
| ACK, NACK/DTX, NACK/DTX, ACK | nPUCCH_0 | 0, 1 |
| ACK, NACK/DTX, NACK/DTX, NACK/DTX | nPUCCH_0 | 1, 1 |
| NACK/DTX, ACK, ACK, ACK | nPUCCH_1 | 0, 0 |
| NACK/DTX, ACK, ACK, NACK/DTX | nPUCCH_2 | 0, 1 |
| NACK/DTX, ACK, NACK/DTX, ACK | nPUCCH_3 | 1, 0 |
| NACK/DTX, ACK, NACK/DTX, NACK/DTX | nPUCCH_1 | 0, 1 |
| NACK/DTX, NACK/DTX, ACK, ACK | nPUCCH_3 | 0, 1 |
| NACK/DTX, NACK/DTX, ACK, NACK/DTX | nPUCCH_2 | 0, 0 |
| NACK/DTX, NACK/DTX, NACK/DTX, ACK | nPUCCH_3 | 0, 0 |
| NACK, NACK/DTX, NACK/DTX, NACK/DTX | nPUCCH_0 | 0, 0 |
| DTX, NACK/DTX, NACK/DTX, NACK/DTX | No transmission | |

In addition, downlink data is generally scheduled dynamically using a PDCCH (Physical Downlink Control Channel, physical downlink control channel). To enable a UE (User Equipment, user equipment) to discover a PDCCH loss, a DAI (Downlink Assignment Index, downlink assignment index) technology is introduced in LTE release 8 and used to indicate the number of PDCCHs sent in a binding window till a current subframe. In LTE release 10, two methods for sending feedback information in an uplink are defined, that is, a method based on channel selection and a method based on PUCCH (Physical Uplink Shared Channel, physical uplink shared channel) format 3. The method based on channel selection can only support the case that two cells adopt a CA technology, whereas the method based on PUCCH format 3 can support the case that 5 cells adopt the CA technology. In the two methods, the DAI may be used for sorting feedback information of each downlink subframe inside a binding window.

For a TDD system adopting the CA technology, uplink and downlink configurations of a plurality of cells may be different. In a same uplink subframe, which downlink subframes in each cell need to send feedback information depends on a timing relationship of feedback information adopted in a system. Here, based on an actual uplink and downlink configuration of each cell, the number of downlink subframes that is in different cells and need to send feedback information in a same uplink subframe may be unequal. The purpose of the embodiments of the present invention is to solve the problem of how to send feedback information after a timing relationship of feedback information is determined. The proposed method may be applicable to various possible timing relationships of feedback information, which is not limited to a certain timing method of feedback information adopted in the system.

The embodiment of the present invention is described by using the method based on channel selection as an example, which is not limited thereto. Similarly, the method based on PUCCH format 3 may also be adopted. For example, the method of the present invention is also applicable to processing of feedback information of each cell when the feedback information is sent based on PUCCH format 3. It is assumed that N cells are configured for a UE, and the number of feedback information bits sent by the UE may be 2N according to the method of the present invention.

Several possible timing relationships of feedback information are illustrated in the following description. FIG. 1A to FIG. 1D are schematic diagrams of a timing relationship of feedback information of a primary cell and a secondary cell.

Referring to FIG. 1A, the primary cell (PCell) adopts uplink and downlink configuration 1, whereas the secondary cell (SCell) adopts uplink and downlink configuration 2. For some subframes, the PCell and the SCell have a consistent duplex direction. For example, subframes 0 of the two cells are both downlink subframes, and subframes 2 of the two cells are both uplink subframes. However, for some special subframes, for example, a subframe 3 and a subframe 8 in FIG. 1, the two cells have different duplex directions. In a uplink subframe 7, the PCell and the Scell need to separately send feedback information of the two subframes. For an uplink subframe 8, the SCell needs to send feedback information of the two subframes, and the Pcell needs to send feedback information of only one subframe.

Figure 1B:
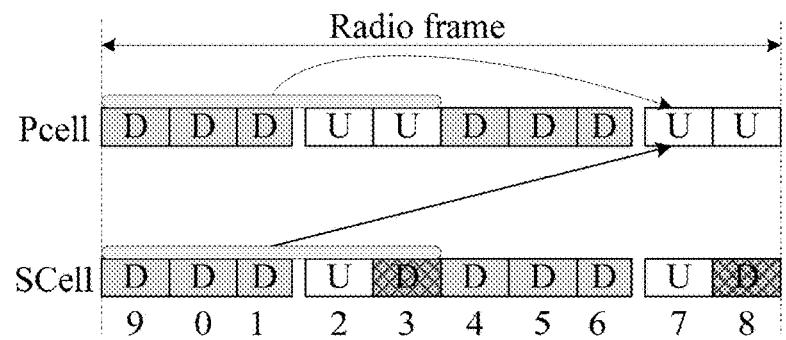

Referring to FIG. 1B, the Pcell adopts uplink and downlink configuration 1, and the Scell adopts uplink and downlink configuration 2. However, feedback timing of feedback information of each downlink subframe is determined based on a timing relationship of feedback information of reference uplink and downlink configuration 2.

Figure 1C:
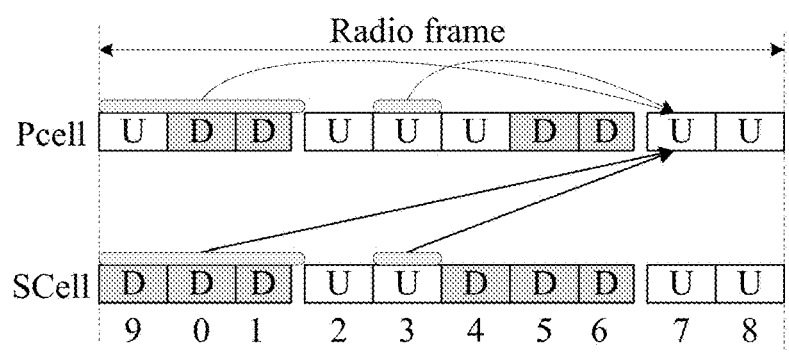

Referring to FIG. 1C, the Pcell adopts uplink and downlink configuration 0, and Scell adopts uplink and downlink configuration 1. However, the feedback timing of feedback information of each downlink subframe is determined based on a timing relationship of feedback information of reference uplink and downlink configuration 2.

Figure 1D:
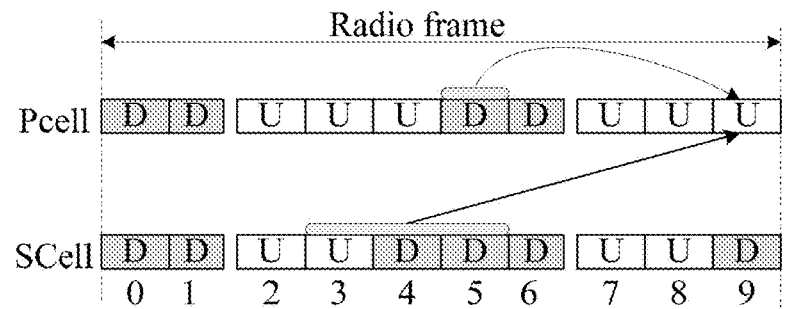

Referring to FIG. 1D, the Pcell adopts uplink and downlink configuration 0, and the Scell adopts uplink and downlink configuration 1. However, the feedback timing of feedback information of each downlink subframe is determined by using an uplink and downlink configuration in LTE release 8 as a reference uplink and downlink configuration, the timing of feedback information is determined for the downlink subframe in the reference uplink and downlink configuration according to the reference uplink and downlink configuration, and a subframe that is an uplink subframe in the reference uplink and downlink configuration and may be a downlink subframe in a practical application follows the timing of feedback information of the subsequent and closest downlink subframe in the reference configuration. In FIG. 1D, the feedback timing of each downlink subframe is determined according to reference uplink and downlink configuration 0.

Embodiment 1

Figure 2:
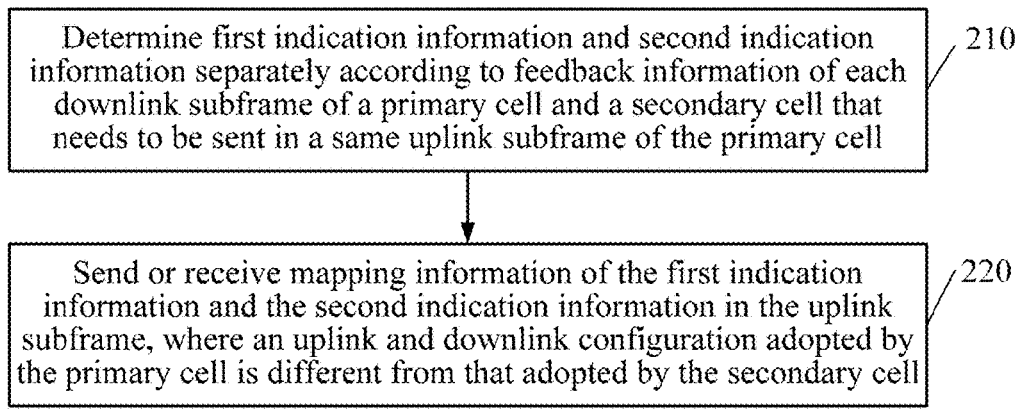
FIG. 2 is a schematic flow chart of a method for implementing hybrid automatic repeat request according to Embodiment 1 of the present invention.

FIG. 2 is a schematic flow chart of a method for implementing hybrid automatic repeat request according to Embodiment 1 of the present invention. A UE executes the method in FIG. 2.

210. Determine first indication information and second indication information separately according to feedback information of each downlink subframe of a primary cell and that of a secondary cell that need to be sent in a same uplink subframe of the primary cell, where the first indication information is used to indicate first feedback information of each downlink subframe of the primary cell that needs to be sent in the uplink subframe, and the second indication information is used to indicate second feedback information of each downlink subframe of the secondary cell that needs to be sent in the uplink subframe.

For example, referring to FIG. 1A, feedback information of a downlink subframe 4 of the primary cell needs to be sent in an uplink subframe 8 of the primary cell, whereas feedback information of downlink subframes 3 and 4 of the secondary cell needs to be sent in the uplink subframe 8 of the primary cell. In an uplink subframe, the feedback information of the primary cell and that of the secondary cell are determined based on the actual number of subframes of the primary cell and that of the secondary cell whose feedback information needs to be sent respectively. For example, the number of downlink subframes of the primary cell whose feedback information needs to be sent is M1, whereas the number of downlink subframes of the secondary cell whose feedback information needs to be sent is M2. The first indication information used to indicate the first feedback information of the downlink subframe of the primary cell may be determined according to the method in which the size of a binding window is M1, and the second indication information used to indicate the second feedback information of the secondary cell may be determined according to the method for processing when the size of the binding window is M2. Here, the binding window refers to a set of downlink subframes whose feedback information needs to be sent in an uplink subframe.

220. Send mapping information of the first indication information and the second indication information in the uplink subframe, where an uplink and downlink configuration adopted by the primary cell is different from that adopted by the secondary cell.

As the uplink and downlink configuration adopted by the primary cell is different from that adopted by the secondary cell, the primary cell and the secondary cell might have different numbers of downlink subframes whose feedback information is sent in a same uplink subframe.

Specifically, the mapping information of the first indication information and the second indication information may be obtained by using the method based on channel selection (for example, according to a channel selection mapping table), and the foregoing mapping information of the first indication information and the second indication information is sent. The embodiment of the present invention is not limited thereto. For example, the mapping information of the first indication information and the second indication information may also be sent by using the method based on PUCCH format 3.

For example, in the method based on channel selection, the UE maps the first indication information of the primary cell and the second indication information of the secondary cell into bits b0 and b1 to send in a channel according to Table 3, that is, the mapping information of the first indication information and the second indication information are bits b0 and b1 to send in a channel.

The embodiment of the present invention may separately process feedback information sent in a same uplink subframe of the primary cell and by a plurality of cells adopting different uplink and downlink configurations, and send mapping information of indication information obtained after processing in the uplink subframe, so as to implement sending feedback information when the cells have different uplink and downlink configurations.

In 210, when the number of first feedback information bits is not greater than a first preset threshold value, the first feedback information is used as the first indication information, or when the number of first feedback information bits is less than the first preset threshold value, filling is performed on the first feedback information, so that the number of the feedback information bits after filling equals the first preset threshold value, and the feedback information after filling is used as the first indication information.

For example, if the number of feedback information bits of one cell is not greater than 2 bits, it is unnecessary to use the method for compressing or binding feedback information. The number of bits fed back by each cell may be fixed at 2 bits, or feedback is performed according to the actual number of feedback information bits that need to be sent.

In 210, when the number of the first feedback information bits is greater than the first preset threshold value, space binding and/or time binding are/is performed on the first indication information, so as to obtain the first indication information, and when the number of second feedback information bits is greater than the first preset threshold value, space binding and/or time binding are/is performed on the second indication information, so as to obtain the second indication information.

In 210, when the number of the first feedback information bits is greater than the first preset threshold value, space binding is performed on the first feedback information, so as to obtain first space binding information, and when the number of first space binding information bits is not greater than the first preset threshold value, the first space binding information is used as the first indication information; alternatively, when the number of the first space binding information bits is less than the first preset threshold value, filling is performed on the first space binding information, so that the number of the first space binding information bits after filling equals the first preset threshold value, and the first space binding information after filling is used as the first indication information; when the number of the first space binding information bits is greater than the first preset threshold value, time binding is performed on the first space binding information, so as to obtain first time binding information, and the first time binding information is used as the first indication information.

For example, space binding is to perform a logical AND operation on feedback information of two code words of each downlink subframe to obtain one bit of indication information. Time binding is to perform compression processing on feedback information of different downlink subframes in a binding window according to the foregoing time binding table.

In 210, when the number of the second feedback information bits is not greater than the first preset threshold value, the second feedback information is used as the second indication information; alternatively, when the number of the second feedback information bits is less than the first preset threshold value, filling is performed on the second feedback information, so that the number of the feedback information bits after filling equals the first preset threshold value, and the feedback information after filling is used as the second indication information.

In 210, when the number of the second feedback information bits is greater than the first preset threshold value, space binding is performed on the second feedback information, so as to obtain second space binding information. When the number of second space binding information bits is not greater than the first preset threshold value, the second space binding information is used as the second indication information; alternatively, when the number of the second space binding information bits is less than the first preset threshold value, filling is performed on the second space binding information, so that the number of the second space binding information bits after filling equals the first preset threshold value, and the second space binding information after filling is used as the second indication information.

When the number of the second space binding information bits is greater than the first preset threshold value, time binding is performed on the second space binding information, so as to obtain second time binding information, and the second time binding information is used as the second indication information.

Optionally, in 210, when the sum of the number of the first feedback information bits and the number of the second feedback information bits is not greater than a second preset threshold value, the first feedback information is used as the first indication information, and the second feedback information is used as the second indication information, where the second preset threshold value is twice as large as the first preset threshold value.

Optionally, in 210, when the sum of the number of the first feedback information bits and the number of the second feedback information bits is greater than the second preset threshold value, space binding is performed on the first feedback information, so as to obtain the first space binding information, and space binding is performed on the second feedback information, so as to obtain the second space binding information, where the second preset threshold value is twice as large as the first preset threshold value. When the sum of the number of the first space binding information bits and the number of the second space binding information bits is not greater than the second preset threshold value, the first space binding information is used as the first indication information, and the second space binding information is used as the second indication information. When the sum of the number of the first space binding information bits and the number of the second space binding information bits is greater than the second preset threshold value, if the number of the first space binding information bits is not greater than the first preset threshold value, the first space binding information is used as the first indication information, and otherwise time binding is performed on the first space binding information, so as to obtain the first time binding information, and the first time binding information is used as the first indication information; if the number of the second space binding information bits is not greater than the first preset threshold value, the second space binding information is used as the second indication information, and otherwise time binding is performed on the second space binding information, so as to obtain the second time binding information, and the second time binding information is used as the second indication information.

For example, if the number of the feedback information bits is not greater than 4 bits, these bits are directly fed back, and otherwise space binding is performed on the feedback information of each subframe. If the total number of the feedback information bits after space binding is not greater than 4 bits, these feedback information bits after space binding are directly fed back. Otherwise, time binding is further performed on a cell where the number of feedback information bits after space binding is greater than 2, so that the number of bits fed back by each cell is not greater than 2.

In the embodiment of the present invention, the second preset threshold value is twice as large as the first preset threshold value.

In the embodiment of the present invention, the feedback information includes ACK or NACK, the first preset threshold value is 2, and the second preset threshold value is accordingly 4.

For example, ACK or NACK to be sent by the primary cell and that by the secondary cell are separately processed, so that the primary cell and the secondary cell feed back a maximum of 2 bits. When the number of ACK or NACK bits of a cell is greater than 2, a space binding method is used to perform compression to obtain space binding information. If the space binding information needs further compression, time binding may be further performed on the space binding information. For example, the number of bits fed back by the primary cell and the secondary cell may be fixed at 2, so as to permanently use a 4-bit channel selection mapping table for the two cells to feed back 4 bits. Optionally, when the number of ACK or NACK bits is greater than or equal to 2, 2 bits are fed back, and otherwise bits are sent according to the actual number of ACK or NACK bits that need to be sent.

In 220, the mapping information of the first indication information and the second indication information is sent in the uplink subframe based on the channel selection mapping table.

For example, when the primary cell and the secondary cell have a total of 4 bits of indication information (containing the first indication information and the second indication information) that needs to be fed back, the foregoing channel selection mapping table Table 3 may be adopted. When the primary cell and the secondary cell have a total of another number of indication information that needs to be fed back, a corresponding channel selection mapping table may be adopted to send the mapping information of the first indication information and the second indication information in the uplink channel.

In 220, the mapping information of the first indication information and the second indication information is sent in the uplink subframe based on physical uplink shared channel format 3.

For example, when N cells are configured for a UE, that is, a primary cell and a plurality of secondary cells, indication information that does not exceed 2N bits may be sent in the uplink subframe based on physical uplink shared channel format 3.

In 220, the mapping information of the first indication information and the second indication information may be sent in the uplink subframe by using a feedback information channel implicitly assigned for the downlink subframe in a physical downlink control channel.

Optionally, in 220, the mapping information of the first indication information and the second indication information may be sent in the uplink subframe by using a feedback information channel indicated by a feedback information resource indicator ARI in the physical downlink control channel.

For example, if an implicit feedback information channel is assigned for a subframe that sends PDCCH according to the method in LTE release 8, the implicitly assigned feedback information channel is used, and otherwise an ARI is used to dynamically indicate the feedback information channel. A base station uses high-layer signaling to configure 2 groups of feedback information channels for a UE, and each group contains $2^N$ feedback information channels. The ARI in the PDCCH of each subframe is only used to dynamically select a feedback information channel from a group of $2^N$ feedback information channels to assign it to the UE.

Embodiment 2

Figure 3:
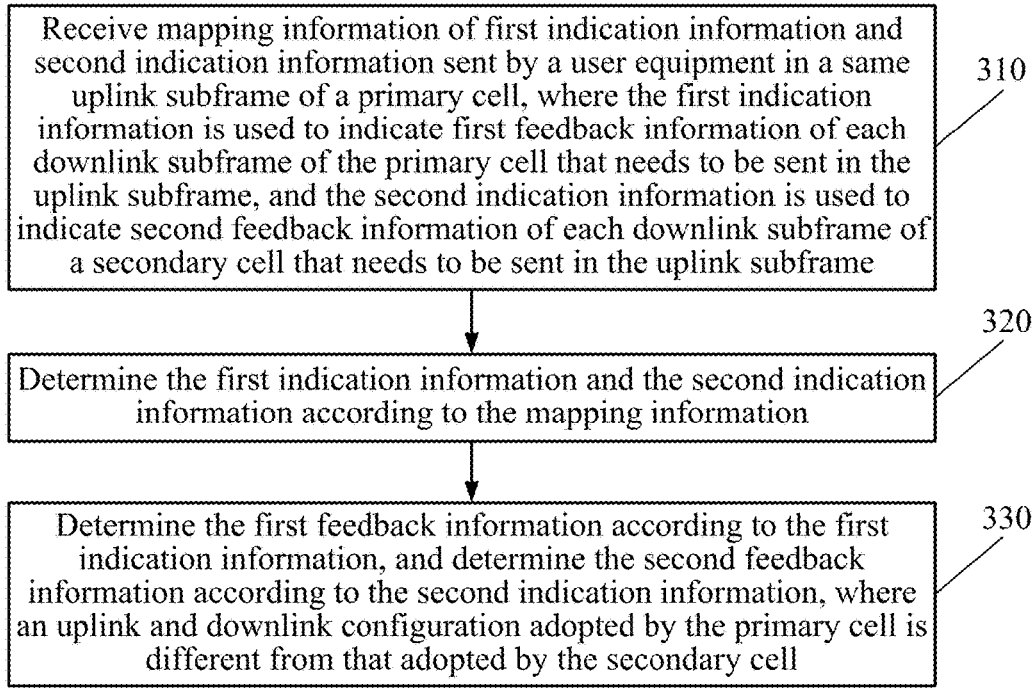
FIG. 3 is a schematic flow chart of a method for implementing hybrid automatic repeat request according to Embodiment 2 of the present invention.

FIG. 3 is a schematic flow chart of a method for implementing hybrid automatic repeat request according to Embodiment 2 of the present invention. A base station executes the method in FIG. 3, which corresponds to the method in FIG. 2, and here detailed description is properly omitted.

310. Receive mapping information of first indication information and second indication information sent by a user equipment in a same uplink subframe of a primary cell, where the first indication information is used to indicate first feedback information of each downlink subframe of the primary cell that needs to be sent in the uplink subframe, and the second indication information is used to indicate second feedback information of each downlink subframe of a secondary cell that needs to be sent in the uplink subframe.

320. Determine the first indication information and the second indication information according to the mapping information.

For example, the base station can receive bits b0 and b1 in the uplink subframe by using blind channel detection, and can obtain the first indication information and the second indication information according to the foregoing channel selection mapping table Table 3.

330. Determine the first feedback information according to the first indication information, and determine the second feedback information according to the second indication information, where an uplink and downlink configuration adopted by the primary cell is different from that adopted by the secondary cell.

In 330, when the number of first feedback information bits is not greater than a first preset threshold value, the first indication information is used as the first feedback information; alternatively, when the number of the first feedback information bits is less than the first preset threshold value, filled information is removed from the first indication information to determine the first feedback information.

For example, the base station can learn the number of the first feedback information bits according to each downlink subframe that is in the primary cell and sends downlink data (for example, PDSCH) to a UE. For example, the base station learns the number of downlink subframes that in each cell and whose feedback information is sent in an uplink subframe of the primary cell and a MIMO transmission mode (that is, the PDSCH of each downlink subframe has one or two code words, and the feedback information of each code word is 1 bit) configured for each cell. Therefore, the base station can obtain the number of the feedback information bits of each cell that needs to be sent in an uplink subframe of the primary cell. For example, still referring to FIG. 1A, the base station sends a PDSCH to the UE by using a downlink subframe 4 of the primary cell. The base station learns that the UE has the feedback information of a downlink subframe of the primary cell that needs to be sent in an uplink subframe 8 of the primary cell. If the PDSCH of each downlink subframe has one code word, the base station learns that the primary cell has one bit of feedback information in total that needs to be sent in the downlink subframe 8 of the primary cell. Because the same filling rule and the first preset threshold value are configured for the base station and the UE in advance, corresponding to the filling performed on the UE, when the number of the first feedback information bits of the base station is less than the first preset threshold value (for example, 2 bits), the operation of removing filled information may be performed on the first indication information to determine the first feedback information. For example, if the filling rule specifies that filled information of 1 bit is filled after the feedback information, the base station removes the filled information to determine the one bit of feedback information that needs to be fed back by the primary cell.

In 330, when the number of the first feedback information bits is greater than the first preset threshold value, a reverse operation of time binding and/or a reverse operation of space binding may be performed on the first indication information to determine the first feedback information.

For example, when the number of the first feedback information bits is greater than the first preset threshold value, the number of first space binding information bits obtained after the UE performs space binding on the first feedback information is calculated. When the number of the first space binding information bits is not greater than the first preset threshold value, the first indication information is used as first space binding information, and the reverse operation of space binding is performed on the first space binding information to determine the first feedback information; alternatively, when the number of the first space binding information bits is less than the first preset threshold value, remove the filling for the first indication information to obtain the first space binding information, and the reverse operation of space binding is performed on the first space binding information to determine the first feedback information. Also, when the number of the first space binding information bits is greater than the first preset threshold value, the reverse operation of time binding (for example, search the foregoing time binding table) is performed on the first indication information to obtain the first space binding information, and the reverse operation of space binding is performed on the first space binding information to determine the first feedback information.

In 330, when the number of second feedback information bits is not greater than the first preset threshold value, the second indication information is used as the second feedback information; alternatively, when the number of the second feedback information bits is less than the first preset threshold value, the filled information is removed from the first indication information to determine the second feedback information.

In 330, when the number of the second feedback information bits is greater than the first preset threshold value, the reverse operation of time binding and/or reverse operation of space binding is performed on the second indication information to determine the second feedback information.

For example, when the number of the second feedback information bits is greater than the first preset threshold value, the number of the second space binding information bits obtained after the UE performs space binding on the second feedback information is calculated. When the number of the second space binding information bits is not greater than the first preset threshold value, the second indication information is used as the second space binding information, and the reverse operation of space binding is performed on the second space binding information to determine the second feedback information; alternatively, when the number of the second space binding information bits is less than the first preset threshold value, the filling for the second indication information is removed to obtain the second space binding information, and the reverse operation of space binding is performed on the second space binding information to determine the second feedback information. When the number of the second space binding information bits is greater than the first preset threshold value, the reverse operation of time binding (for example, search the foregoing time binding table) is performed on the second indication information to obtain the second space binding information, and the reverse operation of space binding is performed on the second space binding information to determine the second feedback information.

In 330, when the sum of the number of the first feedback information bits and the number of the second feedback information bits is not greater than a second preset threshold value, the first indication information is used as the first feedback information, and the second indication information is used as the second feedback information, where the second preset threshold value is twice as large as the first preset threshold value.

In 330, when the sum of the number of the first indication information bits and the number of the second indication information bits is greater than the second preset threshold value, the reverse operation of space binding and/or reverse operation of time binding is performed on the first indication information to determine the first feedback information, and the reverse operation of space binding and/or reverse operation of time binding is performed on the second indication information to determine the second feedback information.

For example, when the sum of the number of the first feedback information bits and the number of the second feedback information bits is greater than the second preset threshold value, the number of the first space binding information bits and the number of the second space binding information bits obtained after the UE performs space binding on the first feedback information and the second feedback information are separately calculated. When the sum of the number of the first space binding information bits and the number of the second space binding information bits is not greater than the second preset threshold value, the first indication information and the second indication information are used as the first space binding information and the second space binding information respectively, and the reverse operation is performed on the first space binding information and the second space binding information to determine the first feedback information and the second feedback information respectively. When the sum of the number of the first space binding information bits and the number of the second space binding information bits is greater than the second preset threshold value, the reverse operation of time binding is separately performed on the first indication information and the second indication information to obtain the first space binding information and the second space binding information, and the reverse operation of space binding is separately performed on the first space binding information and the second space binding information to obtain the first feedback information and the second feedback information.

In 330, the first indication information and the second indication information are determined according to the mapping information based on the channel selection mapping table.

Optionally, as another embodiment, in 330, the first indication information and the second indication information are determined according to the mapping information based on physical uplink shared channel format 3.

Embodiment 3

Figure 4:
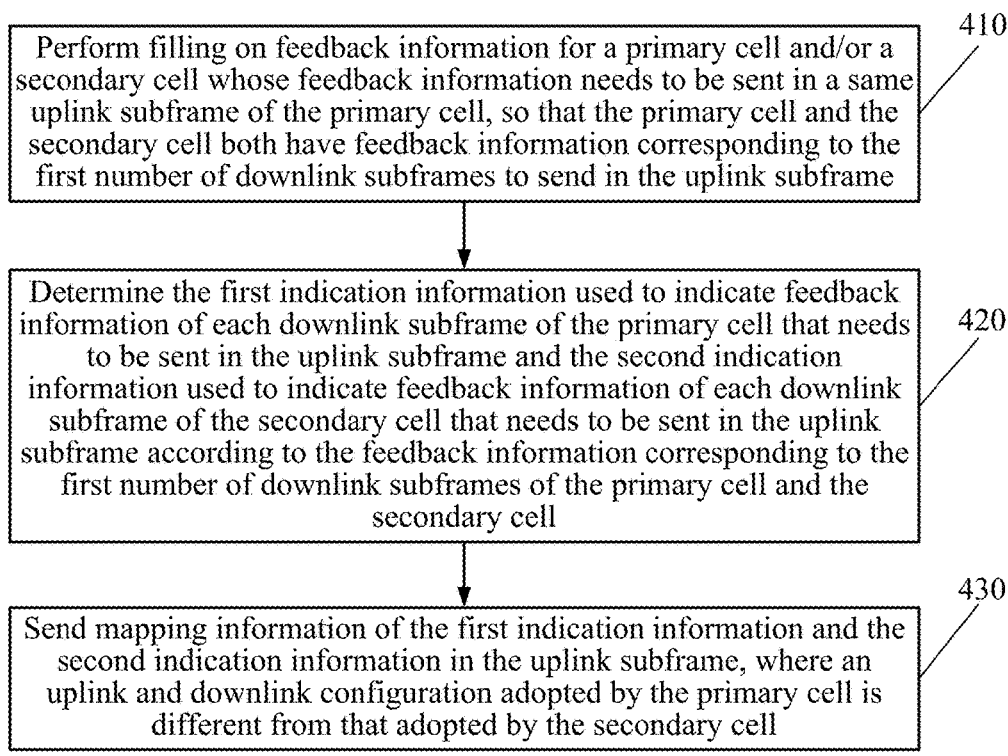
FIG. 4 is a schematic flow chart of a method for implementing hybrid automatic repeat request according to Embodiment 3 of the present invention.

FIG. 4 is a schematic flow chart of a method for implementing hybrid automatic repeat request according to Embodiment 3 of the present invention. A UE executes the method in FIG. 4.

410. Perform filling on feedback information for a primary cell and/or a secondary cell whose feedback information needs to be sent in a same uplink subframe of the primary cell, so that the primary cell and the secondary cell both have feedback information corresponding to the first number of downlink subframes to send in the uplink subframe.

For example, the embodiment of the present invention can process the feedback information of each cell by adopting a consistent method according to the maximum value, that is, max (M1, M2), of the actual number of subframes of the primary cell and that of the secondary cell whose feedback information needs to be sent in a same uplink subframe of a primary cell, where the actual number of subframes of the primary cell whose feedback information needs to be sent in the uplink subframe is M1, the actual number of subframes of the secondary cell whose feedback information needs to be sent is M2, or the actual number of subframes of the primary cell whose feedback information needs to be sent in the uplink subframe may also be M2, and the actual number of subframes of secondary cells whose feedback information needs to be sent is M1. For example, the first number may be M2, or also be greater than M2. For example, the feedback information of each cell may be processed according to a defined size of a binding window in the method where a timing relationship of feedback information is configured, or the feedback information of each cell may also be processed according to the defined binding window in the method where a timing relationship of feedback information is configured and according to the maximum value of the actual number of downlink subframes of each cell whose feedback information needs to be sent in this bundling window. In this embodiment, the size of a binding window may be greater than M2.

420. Determine first indication information used to indicate feedback information of each downlink subframe of the primary cell that needs to be sent in the uplink subframe and second indication information used to indicate feedback information of each downlink subframe of the secondary cell that needs to be sent in the uplink subframe according to the feedback information corresponding to the first number of downlink subframes of the primary cell and the secondary cell.

For example, space binding and/or time binding is performed on the feedback information of the first number of downlink subframes of the primary cell and the secondary cell, so as to obtain the first indication information and the second indication information.

430. Send mapping information of the first indication information and the second indication information in the uplink subframe, where an uplink and downlink configuration adopted by the primary cell is different from that adopted by the secondary cell.

For example, similar to 220, the base station receives the mapping information of the first indication information and the second indication information in the uplink subframe, and the UE sends the mapping information of the first indication information and the second indication information in the uplink subframe.

In the embodiment of the present invention, filling can be performed on feedback information for each cell whose feedback information needs to be sent in an uplink subframe of the primary cell, so that the feedback information of each cell may also be processed by adopting a consistent method, so as to implement sending feedback information when cells have different uplink and downlink configurations.

In the embodiment of the present invention, the first number equals the maximum value of the number of downlink subframes of the primary cell and the secondary cell whose feedback information needs to be sent in the uplink subframe.

In the embodiment of the present invention, when the set of the downlink subframes of the primary cell whose feedback information needs to be sent in the uplink subframe is K1, the set of downlink subframes of the secondary cell whose feedback information needs to be sent in the uplink subframe is K2, and the set K1 is a subset of the set K2, in 410, the feedback information of the subframes that belong to the set K2 and do not belong to the set K1 in the primary cell is set to discontinuous transmission information (Discontinuous Transmission, DTX). When the set of downlink subframes of the secondary cell whose feedback information needs to be sent in the uplink subframe is K1, the set of the downlink subframes of the primary cell whose feedback information needs to be sent in the uplink subframe is K2, and the set K1 is a subset of the set K2, in 410, the feedback information of the subframes that belong to the set K2 and do not belong to the set K1 in the secondary cell may be set to discontinuous transmission information DTX.

In the embodiment of the present invention, the first number is the size of a binding window in the configured timing relationship of feedback information, the first number is greater than the number of downlink subframes of the primary cell whose feedback information needs to be sent in the uplink subframe, and the first number is greater than the number of downlink subframes of the secondary cell whose feedback information needs to be sent in the uplink subframe. In 310, feedback information may be filled for the primary cell and the secondary cell whose feedback information needs to be sent in the uplink subframe.

Optionally, in 410, the feedback information of cells to fill feedback information in the primary cell and the secondary cell is sorted. When the first feedback information in the feedback information of the cell to fill feedback information is acknowledgment information ACK, a piece of acknowledgment information is filled before the first feedback information, so as to determine the feedback information after filling; alternatively, when the first feedback information is negative acknowledgment information NACK or discontinuous transmission information DTX, a piece of DTX is filled before the first feedback information, so as to determine the feedback information after filling.

It should be noted that when a semi-statically scheduled service exists, the feedback information channel indicated by the physical control channel whose downlink assignment index DAI equals 1 is used as the first feedback information channel for sending the feedback information after filling, and the semi-statically scheduled feedback information channel is used as the second feedback information channel for sending the feedback information after filling. When a semi-statically scheduled service does not exist, the feedback information channel indicated by the physical control channel whose downlink assignment index equals 2 is used as the first feedback information channel for sending the feedback information after filling, and the feedback information channel indicated by the physical control channel whose downlink assignment index equals 1 is used as the second feedback information channel for sending the feedback information after filling.

It should be noted that in 420, space binding processing and/or time binding processing may be performed on the feedback information corresponding to the first number of downlink subframes of the primary cell and the secondary cell, so as to determine the first indication information and the second indication information.

It should be noted that in 430, the mapping information of the first indication information and the second indication information is sent in the uplink subframe based on the channel selection mapping table; alternatively, the mapping information of the first indication information and the second indication information is sent in the uplink subframe based on physical uplink shared channel format 3.

Embodiment 4

Figure 5:
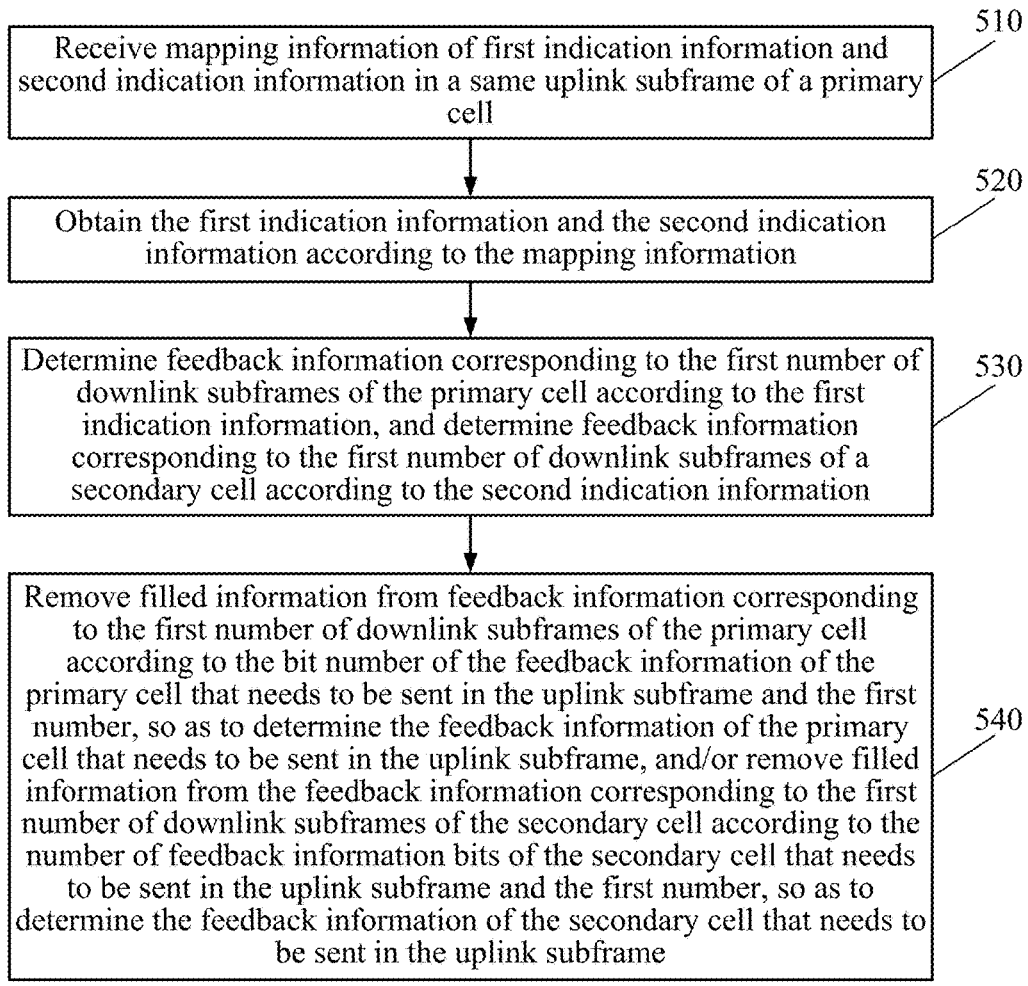
FIG. 5 is a schematic flow chart of a method for implementing hybrid automatic repeat request according to Embodiment 4 of the present invention.

FIG. 5 is a schematic flow chart of a method for implementing hybrid automatic repeat request according to Embodiment 4 of the present invention. A base station executes the method in FIG. 5.

510. Receive mapping information of first indication information and second indication information in a same uplink subframe of a primary cell.

520. Obtain the first indication information and the second indication information according to the mapping information.

For example, the base station can receive bits b0 and b1 in the uplink subframe by using blind channel detection, and can obtain the first indication information and the second indication information according to the foregoing channel selection mapping table Table 3.

530. Determine feedback information corresponding to the first number of downlink subframes of the primary cell according to the first indication information, and determine feedback information corresponding to the first number of downlink subframes of a secondary cell according to the second indication information.

For example, a reverse operation of time binding and/or reverse operation of space binding may be performed on the first indication information to determine the feedback information corresponding to the first number of downlink subframes of the primary cell, and the reverse operation of time binding and/or reverse operation of space binding may be performed on the second indication information to determine the feedback information corresponding to the first number of downlink subframes of the secondary cell.

540. Remove filled information from the feedback information corresponding to the first number of downlink subframes of the primary cell according to the number of feedback information bits of the primary cell that needs to be sent in the uplink subframe and the first number, so as to determine the feedback information of the primary cell that needs to be sent in the uplink subframe, and/or remove filled information from the feedback information corresponding to the first number of downlink subframes of the secondary cell according to the number of feedback information bits of the secondary cell that needs to be sent in the uplink subframe and the first number, so as to determine the feedback information of the secondary cell that needs to be sent in the uplink subframe.

In the embodiment of the present invention, filling can be performed on feedback information for each cell whose feedback information needs to be sent in an uplink subframe of the primary cell, so that the feedback information of each cell may be processed by adopting a consistent method, so as to implement sending feedback information when cells have different uplink and downlink configurations. On the base station side, the method corresponding to a terminal is executed to determine that the user equipment sends feedback information in an uplink subframe of the primary cell.

In the embodiment of the present invention, the first number equals the maximum value of the number of downlink subframes of the primary cell and the secondary cell whose feedback information needs to be sent in the uplink subframe.

In the embodiment of the present invention, the first number is the size of a binding window in a configured timing relationship of feedback information, the first number is greater than the number of downlink subframes of the primary cell whose feedback information needs to be sent in the uplink subframe, and the first number is greater than the number of downlink subframes of the secondary cell whose feedback information needs to be sent in the uplink subframe.

In 520, the first indication information and the second indication information are determined based on a channel selection mapping table according to the mapping information.

Optionally, in 520, the first indication information and the second indication information are determined according to the mapping information based on physical uplink shared channel format 3.

Embodiment 5

Figure 6:
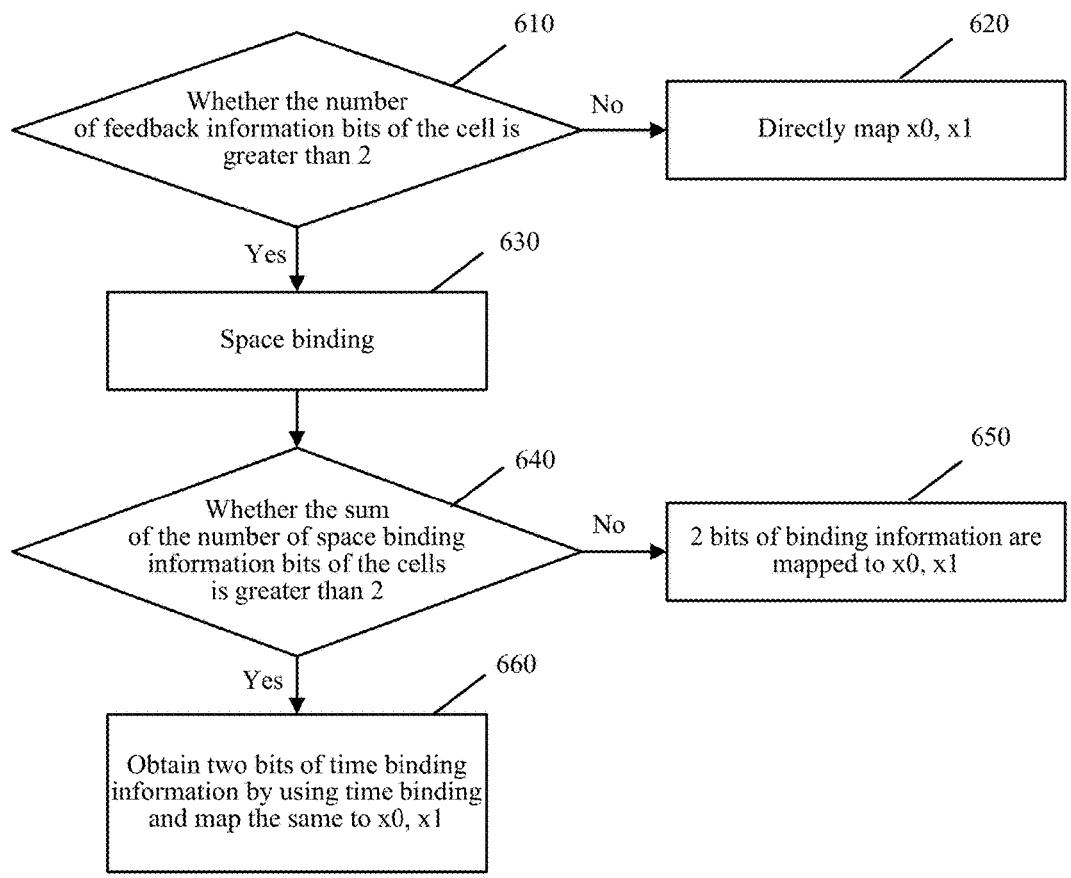
FIG. 6 is a schematic flow chart of a process of implementing hybrid automatic repeat request according to Embodiment 5 of the present invention.

FIG. 6 is a schematic flow chart of a process of implementing hybrid automatic repeat request according to Embodiment 5 of the present invention. Embodiment 5 provides more details for one or more steps in the methods in Embodiment 1 to Embodiment 4.

In the embodiment of the present invention, the feedback information of the downlink subframe that is of each cell and sent in an uplink subframe can be separately processed, so that each cell eventually needs to feed back a maximum of two bits of indication information. Here, it is set that the two bits of indication information that a cell eventually feeds back are x0, x1, which may directly correspond to feedback information of a PDSCH, or may also be information obtained by using compression or binding operation (for example, space binding or time binding) processing on the feedback information of each PDSCH.

610. Determine whether the number of feedback information bits of each cell that needs to be sent in a same uplink subframe of a primary cell exceeds a first preset threshold value (for example, 2 bits).

The maximum number of the feedback information bits of the cell that needs to be sent can be determined according to the number of downlink subframes of the cell whose feedback information is sent in the uplink subframe and whether a MIMO (Multiple-Input Multiple-Output, multiple-input multiple-output) transmission mode is configured for the cell. For example, when the number of downlink subframes is 2 and a MIMO transmission mode is configured for the cell (that is, a PDSCH of each downlink subframe has two code words), the maximum number of the feedback information bits of the cell that needs to be sent in the uplink subframe is 4.

620. If the number of the feedback information bits sent in the uplink subframe of the cell is not greater than 2 bits, it is unnecessary to use the method for performing binding on feedback information, and directly feed back these feedback information bits, or when the number of the feedback information bits sent in the uplink subframe is less than 2 bits, perform filling on the feedback information before sending.

For example, when the number of subframes of the cell whose feedback information needs to be sent in the uplink subframe is 2, and each subframe needs to feed back only one bit of feedback information, that is, a MIMO transmission mode is not adopted, the two bits x0 and x1 can be directly obtained. When the number of downlink subframes of the cell whose feedback information needs to be sent in the uplink subframe is 1 and the downlink subframe of the cell needs to feed back two bits of feedback information, two bits x0 and x1 to be fed back may also be directly obtained, which sequentially correspond to two code words of the PDSCH in the downlink subframe. When the number of subframes of the cell whose feedback information needs to be sent in the uplink subframe is 1 and the subframe needs to send only one bit of feedback information, the bit of the feedback information may be directly mapped into the bit x0 to be fed back, at the same time an idle bit x1 is filled, and the idle bit may be mapped into DTX, so as to obtain two bits to be fed back. Optionally, the cell may also feed back only a bit x0 without adding an idle bit x1. In addition, depending on the adopted timing method of feedback information, it might occur that feedback information of any downlink subframe of a cell does not need to be fed back in an uplink subframe. At this time, two idle bits x0 and x1 can be permanently added to obtain two bits to be fed back. The idle bits may be mapped into DTX. Optionally, the cell may also feedback no information. Optionally, based on the transmission mode configured for the cell, if a downlink subframe needs to feed back two bits of feedback information, two idle bits x0 and x1 are filled to obtain two bits to be fed back. If a downlink subframe needs to feed back one bit of feedback information, only one idle bit x0 is filled to obtain one bit to be fed back.

630. If the number of the feedback information bits of the cell sent in the uplink subframe is greater than 2 bits, perform space binding on the feedback information of each downlink subframe. Specifically, when each downlink subframe needs to feed back two bits of feedback information, perform an AND operation on the feedback information of two code words of the PDSCH of a same downlink subframe. For example, bound ACK is obtained only when the two pieces of feedback information are both ACK, and otherwise, bound NACK/DTX is obtained.

640. Determine whether the number of space binding information bits obtained after the cell performs space binding on each downlink subframe exceeds the target 2 bits.

650. If the number of the space binding information bits obtained after space binding equals 2, that is, the number of subframes of a cell whose feedback information needs to be sent in an uplink subframe is 2, and each subframe needs to send two bits of feedback information, map the two bits of space binding information into indication information x0 and x1 respectively.

660. If the number of the space binding information bits is still greater than 2, that is, the number of subframes of the cell whose feedback information needs to be sent in the uplink subframe is greater than 2, further perform time binding on the space binding information. For example, when the number of downlink subframes whose feedback information needs to be sent is 3 or 4, adopt the mapping methods in Table 1 and Table 2 to map the two bits after time binding into indication information x0 and x1 respectively.

After 610 to 660 are executed on each cell, the indication information x0 and x1 that each cell eventually feeds back in the uplink subframe is not greater than two bits, so as to use a channel selection mapping table similar to Table 3 to send ACK or NACK information.

When a channel selection method is adopted, the number of bits fed back by each cell may be fixed at 2, so as to permanently use a 4-bit channel selection mapping table for two cells to feed back 4 bits. Optionally, the number of the feedback information bits may also be determined according to the actual number of the feedback information bits of each cell that need to be sent, so that the total number of the feedback information bits the two cells that need to be sent is not constant.

When the foregoing feedback information is sent, a backup feedback information channel needs to be correspondingly assigned to each bit to be fed back. When a feedback information channel needs to be assigned to a subframe, for a primary cell or a secondary cell where cross-carrier scheduling is adopted, a feedback information channel may be implicitly obtained according to a PDCCH that schedules the subframe; for a secondary cell where non-cross-carrier scheduling is adopted, a feedback information channel may be obtained according to an ARI (ACK or NACK Resource Indicator, ACK or NACK resource indicator) in the PDCCH. When two feedback information channels need to be assigned to a subframe, for a primary cell or a secondary cell where cross-carrier scheduling is adopted, two feedback information channels may be implicitly obtained according to the PDCCH that schedules the subframe; for a secondary cell where non-cross-carrier scheduling is adopted, two feedback information channels can be obtained according to the ARI in the PDCCH.

When each cell permanently feeds back 2 bits, if the number of subframes of a cell whose feedback information needs to be sent in an uplink subframe is 1 and the subframe needs to feed back only one feedback information bit, for a primary cell or a secondary cell where cross-carrier scheduling is adopted, a feedback information channel may be implicitly obtained according to the PDCCH that schedules the subframe. For a secondary cell where non-cross-carrier scheduling is adopted, a feedback information channel is obtained according to the ARI in the PDCCH. The channel selection method ensures that a feedback information channel corresponding to an idle bit is not selected, so as not to assign a feedback information channel of an idle bit. Optionally, a feedback information channel corresponding to an idle bit may also be assigned by adopting other methods. However, the feedback information channel is practically not used. If feedback information of any downlink subframe of a cell does not need to be fed back in an uplink subframe, that is, the two bits x0 and x1 are both idle bits. The channel selection method ensures that feedback information channels corresponding to the two idle bits are not selected, and therefore the feedback information channels corresponding to the bits x0 and x1 are practically not assigned. Optionally, if the feedback information channels corresponding to x0 and x1 are assigned by adopting other methods, the two feedback information channels are practically not used either.

When each cell permanently feeds back 2 bits, the two bits x0 and x1 of the primary cell are sequentially mapped to bits HARQ-ACK (0) and HARQ-ACK (1). Two backup feedback information channels are sequentially mapped to backup channels nPUCCH_0 and nPUCCH_1. The two bits x0 and x1 of the secondary cell are sequentially mapped to bits HARQ-ACK (2) and HARQ-ACK (3), and two backup feedback information channels are sequentially mapped to backup channels nPUCCH_2 and nPUCCH_3, so that the method based on channel selection method can be used to feed back 4 bits of information HARQ-ACK (0), HARQ-ACK (1), HARQ-ACK (2), and HARQ-ACK (3) by using four channels nPUCCH_0, nPUCCH_1, nPUCCH_2, and nPUCCH_3. For example, the channel selection mapping table shown in Table 3 can be used, or other mapping tables may be used, which is not limited in the present invention.

For the method of determining the number of feedback bits according to the actual number of feedback information bits of each cell that need to be fed back, for example, A bits need to be fed back by a primary cell, B bits need to be fed back by the secondary cell, and here the sum of A and B is less than or equal to 4, so that feedback bits of the primary cell are sequentially mapped to bits HARQ-ACK (0), . . . , and HARQ-ACK (A−1), and the backup feedback information channels are sequentially mapped to backup channels nPUCCH_0, . . . , and nPUCCH_(A−1); feedback bits of the secondary cell are sequentially mapped to bits HARQ-ACK (A), . . . , and HARQ-ACK (A+B−1), and the backup feedback information channels are sequentially mapped to backup channels nPUCCH_(A), . . . , and nPUCCH_(A+B−1). Therefore, the method based on channel selection can be used to feed back A+B bits of information HARQ-ACK (0), . . . , and HARQ-ACK (A+B−1) by using A+B channels nPUCCH_0, . . . , and nPUCCH_(A+B−1). For example, the channel selection mapping table shown in Table 3 may be adopted, or other mapping tables may also be used, which is not limited in the present invention.

In the embodiment of the present invention, feedback information of each cell is processed according to the actual number of downlink subframes of the feedback information of each cell that needs to be sent (that is, the size of a binding window). Therefore, the feedback capability of 4 bits of information in a channel selection method can be fully utilized, so as to maximize downlink throughput.

Embodiment 6

Figure 7:
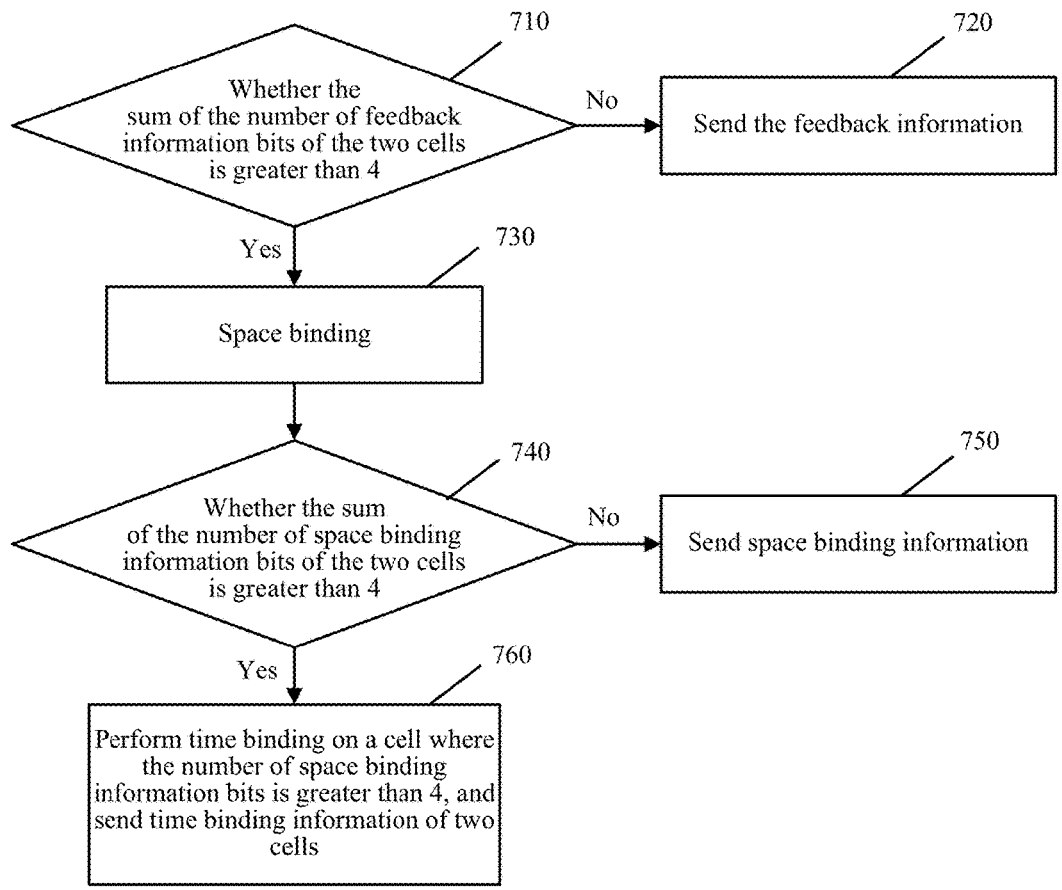
FIG. 7 is a schematic flow chart of a process of implementing hybrid automatic repeat request according to Embodiment 6 of the present invention.

FIG. 7 is a schematic flow chart of a process of implementing hybrid automatic repeat request according to Embodiment 6 of the present invention. Embodiment 6 provides details for one or more steps in the methods in Embodiment 1 to Embodiment 4.

In the embodiment of the present invention, the method for processing feedback information is determined according to the sum of the number of feedback information bits of two cells (a primary cell and a secondary cell) that need to be fed back in a same uplink subframe. A method based on channel selection is applicable, so as to support a case where a maximum of 4 bits of information can be fed back for the two cells, and a method based on PUCCH format 3 is also applicable, so as to support a case where the number of feedback information bits sent by a UE is 2N, where N indicates the number of cells configured for the UE.

710. Determine whether the sum of the number of the feedback information bits of the two cells that are sent in the uplink subframe exceeds the target 4 bits.

The maximum number of the feedback information bits of the two cells that need to be sent is determined according to the number of downlink subframes of the feedback information of each cell that is sent in the uplink subframe and the number of the feedback information bits that need to be sent by each downlink subframe. For example, the number of downlink subframes of feedback information of the primary cell that needs to be sent in the uplink subframe is 2, each downlink subframe sends 2 bits of feedback information, the number of downlink subframes of the feedback information of the secondary cell that needs to be sent in the uplink subframe is 1, and each downlink subframe sends 2 bits of feedback information. Therefore, the sum of the number of the feedback information bits of the two cells that need to be sent is 6.

720. If the sum of the number of the feedback information bits of the two cells that are sent in the uplink subframe is not greater than 4 bits, it is unnecessary to use the method for compressing feedback information, and directly feed back the bits of feedback information or send the bits of feedback information after filling is performed on the feedback information.

730. If the sum of the number of the feedback information bits of the two cells that are sent in the uplink subframe is greater than 4 bits, separately perform space binding on feedback information of each downlink subframe. Specifically, when each downlink subframe needs to send two bits of feedback information in the uplink subframe, perform an AND operation on feedback information of two code words of a PDSCH of a same downlink subframe. For example, when the two pieces of feedback information are both ACK, bound ACK is obtained, and otherwise bound NACK/DTX is obtained.

740. Determine whether the sum of the number of space binding feedback information bits of the two cells that are obtained after space binding is performed on the two cells exceeds the target 4 bits.

750. If the number of the space binding feedback information bits of the two cells is not greater than 4 bits, feed back the space binding information bits in the uplink subframe.

760. If the number of space binding information bits of two cells is still greater than 4, further perform time binding in a cell where the number of the space binding information bits is greater than 2, so that the number of bits fed back by each cell is not greater than 2.

When a channel selection method is adopted, a backup feedback information channel needs to be correspondingly assigned to each bit to be fed back. When a feedback information channel needs to be assigned to a subframe, for a primary cell or a secondary cell where cross-carrier scheduling is adopted, a feedback information channel may be implicitly obtained according to a PDCCH that schedules the subframe; for a secondary cell where non-cross-carrier scheduling is adopted, a feedback information channel may be obtained according to an ARI in the PDCCH. When two feedback information channels need to be assigned to a subframe, for a primary cell or a secondary cell where cross-carrier scheduling is adopted, two feedback information channels may be implicitly obtained according to the PDCCH that schedules the subframe; for a secondary cell where non-cross-carrier scheduling is adopted, two feedback information channels are obtained according to the ARI in the PDCCH.

If feedback information of any downlink subframe of a cell does not need to be fed back in an uplink subframe, information is not fed back for the cell, so that it is unnecessary to assign a feedback information channel. Alternatively, according to a transmission mode of the cell, if a subframe needs to feed back one bit of feedback information, a filling idle bit is sent for the cell. If a subframe needs to feed back 2 bits of feedback information, two filling idle bits are sent for the cell. The channel selection method ensures that a feedback information channel corresponding to an idle bit is not selected, and therefore a feedback information channel corresponding to an idle bit is practically not assigned. Optionally, if a feedback information channel corresponding to an idle bit is assigned by adopting other methods, the two feedback information channels are practically not used either.

For example, A bits need to be fed back by a primary cell, B bits need to be fed back by the secondary cell, and here the sum of A and B is less than or equal to 4, so that feedback bits of the primary cell are sequentially mapped to bits HARQ-ACK (0), . . . , and HARQ-ACK (A−1), and backup feedback information channels are sequentially mapped to backup channels nPUCCH_0, . . . , and nPUCCH_(A−1); feedback bits of the secondary cell are sequentially mapped to bits HARQ-ACK (A), . . . , and HARQ-ACK (A+B−1), and backup feedback information channels are sequentially mapped to backup channels nPUCCH_(A), . . . , and nPUCCH_(A+B−1), so that the method based on channel selection can be used to feed back A+B bits of information HARQ-ACK (0), . . . , and HARQ-ACK (A+B−1) by using A+B channels nPUCCH_0, . . . , and nPUCCH_(A+B−1). For example, a channel selection mapping table shown in Table 3 may be adopted, or other mapping tables may also be used, which is not limited in the present invention.

In addition, in Embodiment 1, Embodiment 2, and Embodiment 5, for a primary cell or a secondary cell where cross-carrier scheduling is adopted, it is assumed that a feedback information channel implicitly mapped by a PDCCH exists in the method for assigning a backup feedback information channel described above. However, according to a timing relationship of feedback information adopted in a system, a corresponding implicit feedback information channel might not exist according to the method for assigning an implicit feedback information channel defined in LTE release 8. For example, for the timing method shown in FIG. 1B, although the primary cell adopts an uplink and downlink configuration 1, the feedback timing of feedback information of each downlink subframe is determined according to the timing relationship of feedback information of a reference uplink and downlink configuration 2. According to this timing relationship, feedback information of a downlink subframe 9 is sent in an uplink subframe 7. However, according to the method of LTE release 8, an implicit feedback information channel is not assigned to the downlink subframe 9 in the subframe 7, and practically the implicit feedback information channel of the downlink subframe 9 is assigned in the subframe 3 in LTE release 8.

Therefore, a new method needs to be adopted to assign a feedback information channel to a primary cell or a secondary cell where cross-carrier scheduling is adopted. It is assumed that according to the timing relationship of feedback information adopted in the system, the feedback information of a downlink subframe of the primary cell needs to be sent in an uplink subframe. However, a feedback information channel implicitly assigned to this downlink subframe does not exist in the uplink subframe according to the method in LTE release 8.

A method is to add an implicit feedback information channel resource of the downlink subframe for the uplink subframe, so as to implicitly obtain the assigned feedback information channel according to the PDCCH of the downlink subframe. The newly assigned implicit feedback information channels may completely overlap, partially overlap, or do not overlap the feedback information channels assigned in LTE release 8. Therefore, because an implicit feedback information channel is also assigned to the downlink subframe, the foregoing method of the present invention can be directly used.

Another method is to semi-statically configure a plurality of feedback information channels by adopting high-layer signaling, and dynamically indicate a practically used feedback information channel by using the ARI in the PDCCH. According to the number N of ARI bits, a base station can configure $2^N$ groups of feedback information channels for the UE by adopting high-layer signaling. The number of feedback information channels contained in each group equals the number of valid feedback information bits of a cell that need to be fed back in the uplink subframe.

Specifically, if the number of subframes whose feedback information needs to be sent in the uplink subframe is 1, and the subframe needs to feed back only one feedback information bit, each group contains one feedback information channel. Otherwise, each group contains 2 feedback information channels. Then, the base station dynamically indicates currently which group of feedback information channels are practically assigned to the UE by using the ARI in the PDCCH.

Optionally, downlink subframes in a binding window may be processed. If an implicit feedback information channel is assigned to a subframe that sends a PDCCH according to the method of LTE release 8, an implicitly assigned feedback information channel is obtained according to the method of LTE release 8, and otherwise the ARI is used to dynamically indicate the feedback information channel. Specifically, the base station configures 2 groups of feedback information channels for the UE by adopting high-layer signaling, and each group contains $2^N$ feedback information channels. The ARI in the PDCCH of each subframe is only used to dynamically select a feedback information channel from a group of $2^N$ feedback information channels to assign it to the UE. For example, the ARI in the PDCCH where a DAI equals 1 dynamically indicates a channel from the first group of feedback information channels to assign it to the UE. The ARI in the PDCCH where the DAI equals 2 dynamically indicates a channel from the second group of feedback information channels to assign it to the UE. Alternatively, in the case that feedback information of two downlink subframes is fed back in an uplink subframe, in a natural sequence of subframe indexes or a reorganized sequence, the ARI in the PDCCH of the first subframe dynamically indicates a channel from the first group of feedback information channels to assign it to the UE, and the ARI in the PDCCH of the second subframe dynamically indicates a channel from the second group of feedback information channels to assign it to the UE. If the number of subframes of a cell whose feedback information needs to be sent in an uplink subframe is 1, and the subframe needs to feed back two bits of feedback information, the ARI in the PDCCH of the subframe may be used to dynamically indicate a channel separately from each group of feedback information channel to assign it to the UE, so as to assign two feedback information channels. If this method is adopted, when some subframes in the binding window have an implicitly assigned feedback information channel, and other subframes do not have an implicitly assigned feedback information channel, an additional feedback information channel may be dynamically assigned only for downlink subframes that do not have an implicit feedback information channel, thereby lowering the overheads of the feedback information channel.

In the embodiment of the present invention, feedback information of each cell is processed according to the practical size of a binding window of each cell, so that the feedback capability of 4 bits of information in a channel selection method can be fully utilized, so as to maximize downlink throughput.

Embodiment 7

Figure 8:
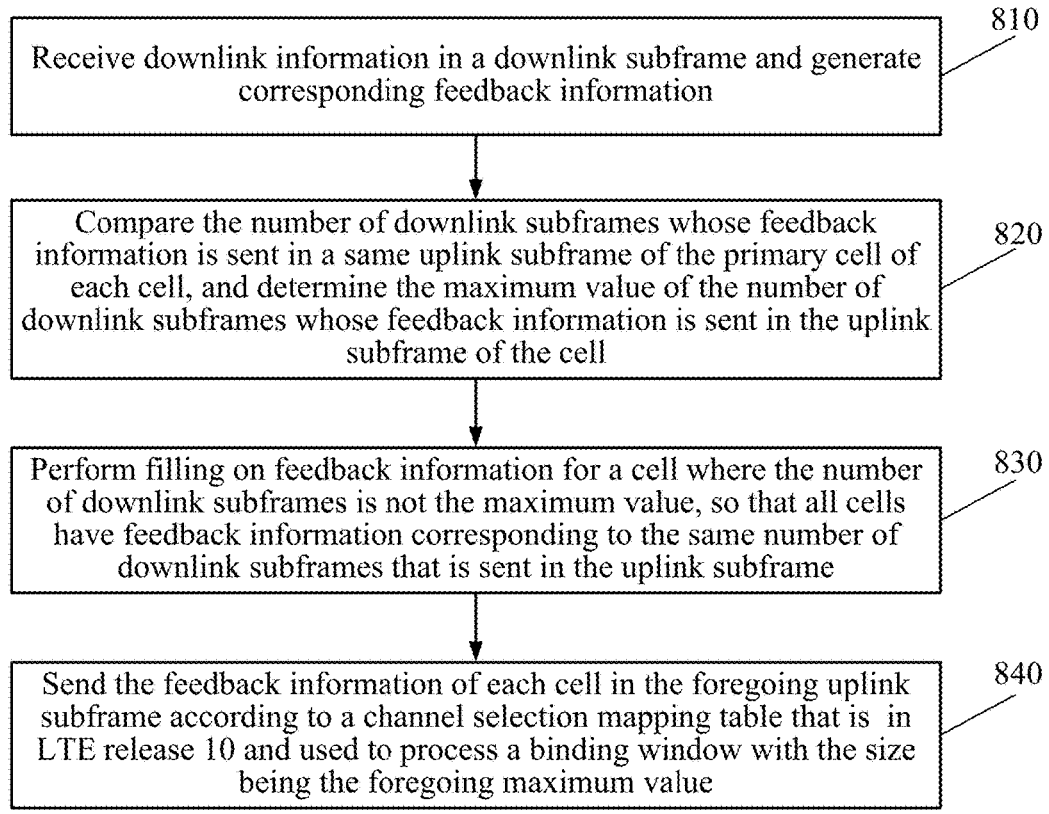
FIG. 8 is a schematic flow chart of a process of implementing hybrid automatic repeat request according to Embodiment 7 of the present invention.

FIG. 8 is a schematic flow chart of a process of implementing hybrid automatic repeat request according to Embodiment 7 of the present invention. Embodiment 7 provides details for one or more steps in the methods in Embodiment 3 and Embodiment 4.

In the embodiment of the present invention, a subframe of a cell (a primary cell or a secondary cell) whose feedback information is sent in an uplink subframe of a primary cell may be represented by adopting a binding window defined in a method for configuring a feedback timing relationship. The value of the binding window is the number of subframes of the cell whose feedback information is sent in the uplink subframe. It should be noted that the size of the binding window may be greater than or equal to the actual number of downlink subframes of the cell whose feedback information needs to be sent. For example, when the feedback timing relationship of a same reference uplink and downlink configuration is adopted both for the feedback timing relationships of the primary cell and the secondary cell, the binding window of the primary cell and the binding window of the secondary cell whose feedback information is sent in a same uplink subframe of the primary cell might both be subsets of the binding window determined according to the feedback timing relationship of the reference uplink and downlink configuration. In the following embodiment, an example in which the value of the binding window equals the actual number of downlink subframes of the cell whose feedback information needs to be sent is used for description.

810. A UE receives downlink information in a downlink subframe and generates corresponding feedback information.

For example, the UE receives downlink information in M1 downlink subframes of the primary cell and generates corresponding feedback information, receives downlink information in M2 downlink subframes of the secondary cell and generates corresponding feedback information, where the feedback information of M1 downlink subframes in a binding window of the primary cell and the feedback information of M2 downlink subframes in a binding window of the secondary cell are sent in a same uplink subframe of the primary cell of carrier aggregation.

820. Compare the number of downlink subframes of each cell whose feedback information is sent in a same uplink subframe of the primary cell, and determine the maximum value of the number of downlink subframes of each cell whose feedback information is sent in the uplink subframe. For example, it is determined through comparison that M2=max (M1, M2).

830. Perform filling on feedback information for a cell where the number of downlink subframes is not the maximum value, so that all cells have feedback information corresponding to the same number of downlink subframes that is sent in the uplink subframe.

For example, the UE add or fill feedback information of M2-M1 subframes on the basis of the feedback information of M1 subframes of the primary cell, so as to obtain feedback information of M2 subframes, so that both the two cells have feedback information of M2 subframes that needs to be fed back. Here, the filled feedback information may be ACK, NACK or DTX. In other words, after the feedback information is filled, the values of the binding windows that are of the two cells and used for sending the feedback information in the uplink subframe are both M2.

Specifically, the feedback information of M1 subframes of the primary cell may be used as the feedback information of the first M1 subframes, and M2-M1 pieces of DTX are filled to form feedback information of M2 subframes to be fed back. Therefore, each cell has M2 subframes whose feedback information needs to be sent, so that the feedback information of the two cells is sent according to the method for processing a binding window being M2 in LTE release 10. Particularly, in the case where M2 equals 1 and M1 equals 0, if according to the transmission mode of a cell where a binding window is M2, 2 bits of feedback information needs to be fed back for each subframe. The filled DTX practically represents that the feedback information of two TBs (Transport Block, transport block) is DTX.

Optionally, it is assumed that in an uplink subframe, a subframe set of feedback information of the primary cell that needs to be sent is labeled as a set K1, and a subframe set of feedback information of the secondary cell that needs to be sent is labeled as a set K2. If K1 is a subset of K2, the feedback information of the subframes that are of the primary cell and belong to the set K2 but do not belong to the set K1 are permanently set to DTX, so that each cell has M2 subframes whose feedback information needs to be sent. Then, the feedback information is sent according to the method for processing a binding window being M2 in LTE release 10.

840. The UE sends the feedback information of each cell in the foregoing uplink subframe according to a channel selection mapping table that is in LTE release 10 and used to process a binding window with the size being the foregoing maximum value.

For example, in the uplink subframe, the primary cell needs to feed back feedback information of 2 subframes, whereas the secondary cell needs to feed back feedback information of 4 subframes, so that the two cells are processed together according to a method where each cell feeds back feedback information of 4 subframes, and therefore the method for sending feedback information by adopting the channel selection mapping table when the size of a binding window is 4 defined in LTE release 10 can be reused. Specifically, first, fill feedback information of 2 subframes fed back in the uplink subframe of the primary cell to obtain feedback information of 4 subframes. Next, perform space binding on the 4 subframes of the primary cell and the secondary cell to separately obtain 4 bits of feedback information. Then, perform time binding on the 4 bits of the primary cell and the secondary cell by using the foregoing table 2 to separately obtain 2 bits of feedback information. Finally, perform channel selection and mapping by adopting Table 3 and send the feedback information by using a corresponding channel.

The method in FIG. 8 uses an example in which the value of a binding window equals the actual number of downlink subframes of the cell whose feedback information needs to be sent for description.

Optionally, the following describes the embodiment of the present invention by using an example in which the value of the binding window is greater than the actual number of downlink subframes of the cell whose feedback information needs to be sent.

Depending on the method for defining a timing relationship of a feedback information, it is possible that a large binding window is set in an uplink subframe, that is, a subframe of a cell whose feedback information needs to be sent in the uplink subframe are a subset thereof alternatively, subframes of two cells whose feedback information needs to be sent in the uplink subframe are subsets thereof.

For example, in FIG. 1C, the Pcell adopts a configuration 0, and the Scell adopts a configuration 1. However, a system determines a timing relationship of feedback messages according to a reference uplink and downlink configuration 2. According to the definition of the reference uplink and downlink configuration 2 in LTE release 8, feedback information of subframes 9, 0, 1, and 3 is sent in a subframe 7, that is, the size of the binding window is 4. However, only the subframes 0 and 1 are downlink subframes for the Pcell, and only subframes 9, 0, and 1 are downlink subframes for the Scell, that is, the actual downlink subframes of the cells are subsets of the binding window defined when the timing relationship of feedback information is determined according to the reference uplink and downlink configuration 2.

For example, in FIG. 1D, it is assumed that in the method for determining a timing relationship of feedback information, an uplink and downlink configuration in LTE release 8 is used as a reference uplink and downlink configuration, And a downlink subframe in the reference uplink and downlink configuration determines the timing of feedback information according to the reference uplink and downlink configuration; a subframe that is an uplink subframe in the reference uplink and downlink configuration but may be a downlink subframe in practical application follows the timing of the feedback information of the subsequent and closest downlink subframe in the reference uplink and downlink configuration. For example, when the configuration 0 is used as the reference uplink and downlink configuration, it can be defined that subframes 3, 4, and 5 all follow the timing of the feedback message in the configuration 0 of the subframe 5, that is, the size of the binding window is 3 according to the definition of the timing relationship. In FIG. 1D, the Pcell adopts the configuration 0, the Scell adopts the configuration 1, and the configuration 0 of the Pcell is used as the reference uplink and downlink configuration. This is because the Scell practically adopts the configuration 1, only subframes 4 and 5 are downlink subframes, and the actual number of downlink subframes that are sent only equals 2.

For the case where the binding window is greater than the actual number of downlink subframes of the cell whose feedback information needs to be sent, two methods may be adopted to process feedback information according to the embodiment of the present invention:

A method is to process the feedback information of each cell according to a defined size of a binding window in the method for configuring a timing relationship of feedback information. For example, in FIG. 1C, filling is first performed on feedback information of each cell, so that each cell has feedback information corresponding to 4 downlink subframes to send. According to the method for processing a binding window that is of the uplink and downlink configuration 2 and whose size is 4, space binding is first performed on each cell. Then, time binding is performed according to that the size of the binding window is 4, so as to obtain 2 bits of feedback information for each cell. In another example, in FIG. 1D, the Scell is processed according to the timing relationship where the configuration 0 is used as the reference, and the size of a binding window is 3. In this case, space binding is first performed on each cell, and then time binding is performed according to that the size of a binding window is 3, so as to obtain 2 bits of feedback information for each cell.

Another method is to process the feedback information of each cell according to the defined binding window in the method for configuring the timing relationship of feedback information and according to the maximum value of the actual number of downlink subframes of each cell whose feedback information needs to be sent in the binding window. For example, in FIG. 1C, the Pcell has two subframes whose feedback information needs to be sent, and the Scell has 3 subframes whose feedback information needs to be sent, and therefore space binding may be first performed on each cell according to the processing method where the size of a binding window is 3. Then, time binding is performed according to that the size of a binding window is 3, so as to obtain 2 bits of feedback information for each cell. In another example, in FIG. 1D, the Pcell has 1 subframe whose feedback information needs to be sent, and the Scell has 2 subframes whose feedback information needs to be sent, and therefore space binding may be performed on each cell according to the processing method where the size of a binding window is 2, so as to obtain 2 bits of feedback information for each cell.

In addition, in the time binding method shown in Table 2, to maximize the difference in an occurrence probability of repeatedly mapping two event when the base station sends data of 4 subframes, repeat mapping of states "A, D, D, D" and "A, A, A, A" exists. The occurrence of the event "A, D, D, D" depends on that the UE correctly receives first data and discards the last 3 PDCCHs. Therefore, the occurrence probability of the event is very low. When the base station schedules only data less than 4 (for example, 3) subframes, the event "A, A, A, A" becomes impossible. Therefore, at this time the UE can report only the event "A, D, D, D", the occurrence of which depends on that the UE correctly receives the first data and discards the subsequent other PDCCHs (for example, the last 2). This is still a very low probability event, which contributes very little to the downlink throughput.

It is assumed that the actual number of subframes of the primary cell whose feedback information needs to be sent is M1, and the actual number of subframes of the secondary cell whose feedback information needs to be sent is M2. To keep the generality, it is assumed that M1 is less than M2. When M2 equals 4 and M1<M2, according to the foregoing analysis, a mapping method of Table 2 can be directly used for a cell where the size of a binding window is M1. As the UE can report only the event "A, D, D, D", the performance is declined. In the embodiment of the present invention, a solution idea is to avoid the reporting of the event "A, D, D, D" as much as possible. Specifically, M1 pieces of feedback information of the cell where the size of a binding window is M1 are sorted, that is, according to the method in LTE release 10, if an SPS (semi-persistent scheduling, semi-persistent scheduling) service exists, the feedback information of the SPS is first fed back, and next other feedback information is sequentially arranged according to the sequence of the DAI. When the SPS service does not exist, the feedback information is sequentially arranged directly according to the sequence of the DAI. When the first feedback information is ACK, a piece of ACK is filled before the M1 pieces of feedback information of the cell. When the first feedback information is NACK/DTX, a piece of DTX is filled before the M1 pieces of feedback information of the cell. Then, DTX is added after the M1+1 pieces of feedback information to obtain M2 pieces of feedback information. Based on the mapping table of Table 2, a valid mapping method obtained at this time is shown in Table 4, where HARQ-ACK (0) is the filled feedback information. The column on the left side is a feedback state that may occur in the method, and the column on the right side is two bits of feedback information mapped corresponding to the mapping table of Table 3.

TABLE 4

| HARQ-ACK (0), HARQ-ACK (1), HARQ-ACK (2), HARQ-ACK (3) | Mapped 2 bits |
|---|---|
| 'A, A, A, N/D' | A, A |
| 'A, A, N/D, any' | N/D, A |
| 'A, A, A, A' | A, N/D |
| 'D, any, any, any' | D, N/D |

Correspondingly, for the method based on channel selection, the resource assignment of feedback information channels is also adjusted to that, if an SPS service exists, the feedback information channel of the PDCCH indication where the DAI equals 1 is used as a first feedback information channel, and the feedback information channel of the SPS is used as a second feedback information channel; if an SPS service does not exist, the feedback information channel of the PDCCH indication where the DAI equals 2 is used as a first feedback information channel, and the feedback information channel of the PDCCH indication where the DAI equals 1 is used as a second feedback information channel.

In the embodiment of the present invention, the feedback information is processed by adopting the same method for two cells, and the channel selection mapping table where the size of a binding window is 1, 2, 3, and 4 defined in LTE release 10 can be reused, thereby lowering the complexity of standardization. In addition, the method in the foregoing Table 4 is adopted, thereby reducing the impact on the downlink throughput.

It should be noted that, in the description of Embodiment 5, Embodiment 6, and Embodiment 7, a UE executes the method. The UE executes the foregoing method, which is equivalent to that encoding operations are performed on the feedback information. A person skilled in the art should understand that on the side of a base station, decoding operations corresponding to the foregoing encoding operations also need to be executed to determine the actual feedback information of the UE that needs to be sent according to the received mapping information of the feedback information. The specific decoding process corresponds to the foregoing encoding process, which is not elaborated here.

The foregoing describes the methods for implementing hybrid automatic repeat request according to the embodiments of the present invention. In the following, a corresponding user equipment, base station, and system as well as a corresponding storage medium and computer program product are described with reference to FIG. 9 to FIG. 12 respectively.

Embodiment 8

Figure 9:
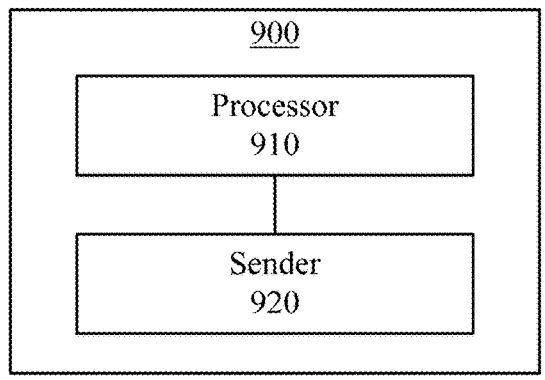
FIG. 9 is a schematic structural diagram of a user equipment according to Embodiment 8 of the present invention.

FIG. 9 is a schematic structural diagram of a user equipment 900 according to Embodiment 8 of the present invention. The user equipment 900 includes: a processor 910 and a sender 920.

The processor 910 is configured to determine first indication information and second indication information separately according to feedback information of each downlink subframe of a primary cell and that of a secondary cell that need to be sent in a same uplink subframe of the primary cell, where the first indication information is used to indicate first feedback information of each downlink subframe of the primary cell that needs to be sent in the uplink subframe, and the second indication information is used to indicate second feedback information of each downlink subframe of the secondary cell that needs to be sent in the uplink subframe.

The sender 920 is configured to send mapping information of the first indication information and the second indication information in the uplink subframe, where an uplink and downlink configuration adopted by the primary cell is different from that adopted by the secondary cell.

In the embodiment of the present invention, feedback information sent in a same uplink subframe of the primary cell and by a plurality of cells adopting different uplink and downlink configurations can be separately processed, and the processed feedback information is sent in the uplink subframe, so as to implement sending feedback information when the cells have different uplink and downlink configurations.

The processor 910 is configured to: when the number of first feedback information bits is not greater than a first preset threshold value, use the first feedback information as the first indication information, or when the number of the first feedback information bits is less than the first preset threshold value, perform filling on the first feedback information, so that the number of the feedback information bits after filling equals the first preset threshold value, and use the feedback information after filling as the first indication information.

The processor 910 is configured to: when the number of the first feedback information bits is greater than the first preset threshold value, perform space binding on the first feedback information, so as to obtain first space binding information. The processor 910 is configured to: when the number of the first space binding information bits is not greater than the first preset threshold value, use the first space binding information as the first indication information; alternatively, when the number of the first space binding information bits is less than the first preset threshold value, perform filling on the first space binding information, so that the number of the first space binding information bits after filling equals the first preset threshold value, and use the first space binding information after filling as the first indication information. The processor 910 is configured to: when the number of the first space binding information bits is greater than the first preset threshold value, perform time binding on the first space binding information, so as to obtain first time binding information, and use the first time binding information as the first indication information.

The processor 910 is configured to: when the number of second feedback information bits is not greater than the first preset threshold value, use the second feedback information as the second indication information, or when the number of the second feedback information bits is less than the first preset threshold value, perform filling on the second feedback information, so that the number of the feedback information bits after filling equals the first preset threshold value, and use the feedback information after filling as the second indication information.

The processor 910 is configured to: when the number of the second feedback information bits is greater than the first preset threshold value, perform space binding on the second feedback information, so as to obtain second space binding information. The processor 910 is configured to: when the number of the second space binding information bits is not greater than the first preset threshold value, use the second space binding information as the second indication information; alternatively, when the number of the second space binding information bits is less than the first preset threshold value, perform filling on the second space binding information, so that the number of the second space binding information bits after filling equals the first preset threshold value, and use the second space binding information after filling as the second indication information. The processor 910 is configured to: when the number of the second space binding information bits is greater than the first preset threshold value, perform time binding on the second space binding information, so as to obtain second time binding information, and use the second time binding information as the second indication information.

Optionally, as a supplement or an exception, the processor 910 is configured to: when the sum of the number of the first feedback information bits and the number of the second feedback information bits is not greater than a second preset threshold value, use the first feedback information as the first indication information, and use the second feedback information as the second indication information.

Optionally, as a supplement or an exception, the processor 910 is configured to: when the sum of the number of the first feedback information bits and the number of the second feedback information bits is greater than the second preset threshold value, perform space binding on the first feedback information to obtain the first space binding information, and perform space binding on the second feedback information to obtain second space binding information. The processor 910 is configured to: when the sum of the number of the first space binding information bits and the number of the second space binding information bits is not greater than the second preset threshold value, use the first space binding information as the first indication information, and use the second space binding information as the second indication information. The processor 910 is configured to: when the sum of the number of the first space binding information bits and the number of the second space binding information bits is greater than the second preset threshold value, if the number of the first space binding information bits is not greater than the first preset threshold value, the processor 910 is configured to use the first space binding information as the first indication information, and otherwise the processor 910 is configured to perform time binding on the first space binding information to obtain the first time binding information, and use the first time binding information as the first indication information; if the number of the second space binding information bits is not greater than the first preset threshold value, the processor 910 is configured to use the second space binding information as the second indication information, and otherwise the processor 910 is configured to perform time binding on the second space binding information, so as to obtain the second time binding information, and use the second time binding information as the second indication information, where the second preset threshold value is twice as large as the first preset threshold value.

It should be noted that the feedback information includes ACK or NACK, and the first preset threshold value is 2.

The sender 920 sends the indication information in the uplink subframe based on a channel selection mapping table or sends the mapping information of the first indication information and the second indication information in the uplink subframe based on physical uplink shared channel format 3.

The sender 920 can send the mapping information of the first indication information and the second indication information in the uplink subframe by using a feedback information channel implicitly assigned to the downlink subframe in a physical downlink control channel or send the mapping information of the first indication information and the second indication information in the uplink subframe by using a feedback information channel indicated by a feedback information resource indicator in the physical downlink control channel.

For the operations executed by hardware or a combination of hardware and corresponding software of the user equipment 900, refer to 210 and 220 in the foregoing method in Embodiment 1, which is not elaborated here to avoid repetition.

In addition, a computer readable media (or medium) is further provided, which includes computer readable instructions that execute, when being run, the following operations: the operations of 210 and 220 in the foregoing method in Embodiment 1.

It should be noted that the feedback information includes ACK or NACK, and the first preset threshold value is 2.

The sending mapping information of the first indication information and the second indication information in the uplink subframe includes: sending the mapping information of the first indication information and the second indication information in the uplink subframe based on the channel selection mapping table; or, sending the mapping information of the first indication information and the second indication information in the uplink subframe based on physical uplink shared channel format 3.

The mapping information of the first indication information and the second indication information is sent in the uplink subframe by using a feedback information channel implicitly assigned to each downlink subframe in the physical downlink control channel. Alternatively, the mapping information of the first indication information and the second indication information is sent in the uplink subframe by using the feedback information channel indicated by the feedback information resource indicator in the physical downlink control channel.

In addition, a computer program product is further provided, which includes the foregoing computer readable medium.

Embodiment 9

Figure 10:
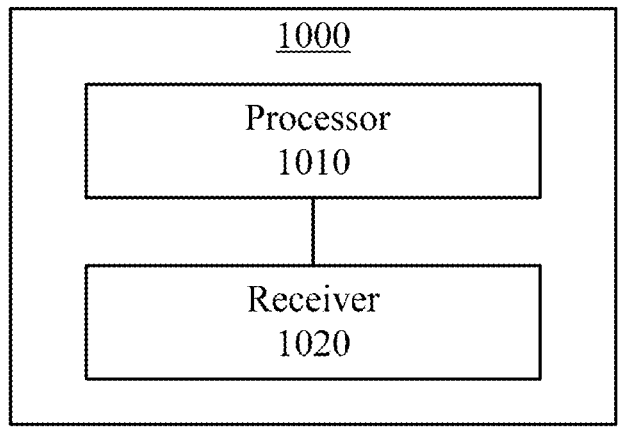
FIG. 10 is a schematic structural diagram of a base station according to Embodiment 9 of the present invention.

FIG. 10 is a schematic structural diagram of a base station 1000 according to Embodiment 9 of the present invention. The base station 1000 includes: a processor 1010 and a receiver 1020.

The receiver 1020 is configured to receive mapping information of first indication information and second indication information sent by a user equipment in a same uplink subframe of a primary cell, where the first indication information is used to indicate first feedback information of each downlink subframe of the primary cell that needs to be sent in the uplink subframe, and the second indication information is used to indicate second feedback information of each downlink subframe of a secondary cell that needs to be sent in the uplink subframe.

The processor 1010 is configured to determine the first indication information and the second indication information according to the mapping information, determine the first feedback information according to the first indication information, and determine the second feedback information according to the second indication information, where an uplink and downlink configuration adopted by the primary cell is different from that adopted by the secondary cell.

In Embodiment 9 of the present invention, feedback information sent in a same uplink subframe of a primary cell and by a plurality of cells adopting different uplink and downlink configurations can be separately processed, and the processed feedback information is sent in the uplink subframe, so as to implement sending feedback information when the cells have different uplink and downlink configurations.

Optionally, as a supplement or an exception, the processor 1010 is configured to: when the number of first feedback information bits is not greater than a first preset threshold value, use the first indication information as the first feedback information, or when the number of the first feedback information bits is less than the first preset threshold value, remove filled information from the first indication information to determine the first feedback information.

The processor 1010 is configured to: when the number of the first feedback information bits is greater than the first preset threshold value, perform a reverse operation of time binding and/or reverse operation of space binding on the first indication information to determine the first feedback information.

The processor 1010 is configured to: when the number of second feedback information bits is not greater than the first preset threshold value, use the second indication information as the second feedback information, or when the number of the second feedback information bits is less than the first preset threshold value, remove the filled information from the first indication information to determine the second feedback information.

The processor 1010 is configured to: when the number of the second feedback information bits is greater than the first preset threshold value, perform the reverse operation of time binding and/or reverse operation of space binding on the second indication information to determine the second feedback information.

The processor 1010 is configured to: when the sum of the number of the first feedback information bits and the number of the second feedback information bits is not greater than a second preset threshold value, use the first indication information as the first feedback information, and use the second indication information as the second feedback information, where the second preset threshold value is twice as large as the first preset threshold value.

The processor 1010 is configured to: when the sum of the number of the first indication information bits and the number of the second indication information bits is greater than the second preset threshold value, perform the reverse operation of space binding and/or reverse operation of time binding on the first indication information to determine the first feedback information, and perform the reverse operation of space binding and/or reverse operation of time binding on the second indication information to determine the second feedback information.

It should be noted that: the feedback information includes ACK or NACK, and the first preset threshold value is 2.

The receiver 1020 receives the indication information in the uplink subframe based on a channel selection mapping table or receives mapping information of the first indication information and the second indication information in the uplink subframe based on physical uplink shared channel format 3.

The receiver 1020 can receive the mapping information of the first indication information and the second indication information in the uplink subframe by using a feedback information channel implicitly assigned to the downlink subframe in a physical downlink control channel or receive the mapping information of the first indication information and the second indication information in the uplink subframe by using a feedback information channel indicated by a feedback information resource indicator in the physical downlink control channel.

For the operations executed by hardware or a combination of hardware and corresponding software of the base station 1000, refer to 310, 320, and 330 in the foregoing method in Embodiment 2, which is not elaborated here to avoid repetition.

In addition, a computer readable media (or medium) is further provided, which includes computer readable instructions that execute, when being run, the following operations: the operations of 310, 320, and 330 in the foregoing method in Embodiment 2.

It should be noted that the feedback information includes ACK or NACK, and the first preset threshold value is 2.

The determining the first indication information and the second indication information according to the mapping information includes: determining the first indication information and the second indication information based on the channel selection mapping table and according to the mapping information; and determining the first indication information and the second indication information according to the mapping information and based on physical uplink shared channel format 3.

In addition, a computer program product is further provided, which includes the foregoing computer readable medium.

Embodiment 10

Figure 11:
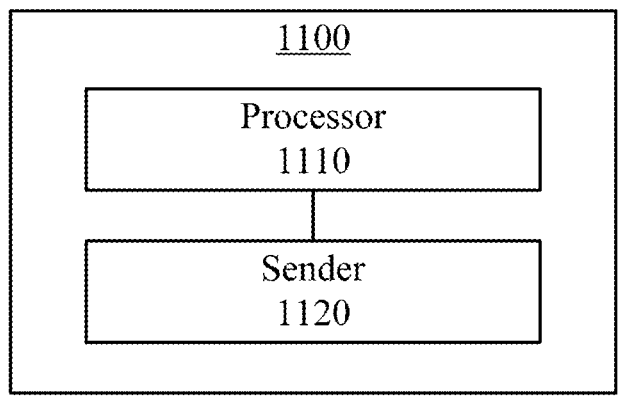
FIG. 11 is a schematic structural diagram of a user equipment according to Embodiment 10 of the present invention.

FIG. 11 is a schematic structural diagram of a user equipment 1100 according to Embodiment 10 of the present invention. The user equipment 1100 includes: a processor 1110 and a sender 1120.

The processor 1110 is configured to perform filling on feedback information for a primary cell and/or a secondary cell whose feedback information needs to be sent in a same uplink subframe of the primary cell, so that the primary cell and the secondary cell both have feedback information corresponding to the first number of downlink subframes to send in the uplink subframe; and determine the first indication information used to indicate the feedback information of each downlink subframe of the primary cell that needs to be sent in the uplink subframe and second indication information used to indicate feedback information of each downlink subframe of the secondary cell that needs to be sent in the uplink subframe according to the feedback information corresponding to the first number of downlink subframes of the primary cell and the secondary cell.

The sender 1120 is configured to send mapping information of the first indication information and the second indication information in the uplink subframe, where an uplink and downlink configuration adopted by the primary cell is different from that adopted by the secondary cell.

In the embodiment of the present invention, filling can be performed on feedback information for each cell that needs to send feedback information in an uplink subframe of the primary cell, so that the feedback information of each cell may also be processed by adopting a consistent method, so as to implement sending feedback information when cells have different uplink and downlink configurations.

Optionally, as a supplement or an exception, the first number equals the maximum value of the number of downlink subframes of the primary cell and the secondary cell whose feedback information needs to be sent in the uplink subframe, in which the number of downlink subframes of the primary cell in the primary cell and the secondary cell whose feedback information is sent in the uplink subframe is not the maximum value.

Optionally, as a supplement or an exception, the first number is the size of a binding window in the configured timing relationship of feedback information, the first number is greater than the number of downlink subframes of the primary cell whose feedback information needs to be sent in the uplink subframe, and the first number is greater than the number of downlink subframes of the secondary cell whose feedback information needs to be sent in the uplink subframe, and the processor 1110 is configured to perform filling in feedback information for the primary cell and the secondary cell whose feedback information needs to be sent in the uplink subframe.

Optionally, as a supplement or an exception, the processor 1110 is configured to sort the feedback information of the cell that is in the primary cell and the secondary cell whose feedback information is to be filled; when the first feedback information in the feedback information of the cell whose feedback information is to be filled is acknowledgment information, fill a piece of acknowledgment information before the first feedback information, so as to determine the feedback information after filling; or when the first feedback information is negative acknowledgment information or discontinuous transmission information, fill a piece of discontinuous transmission information before the first feedback information, so as to determine the feedback information after filling.

Optionally, as a supplement or an exception, the sender 1120 is configured to: when a semi-statically scheduled service exists, use the feedback information channel indicated by the physical control channel whose downlink assignment index equals 1 as the first feedback information channel for sending the feedback information after filling, and use the feedback information channel of the semi-statically scheduled as the second feedback information channel for sending the feedback information after filling; when a semi-statically scheduled service does not exist, use the feedback information channel indicated by the physical control channel whose downlink assignment index equals 2 as the first feedback information channel for sending the feedback information after filling, and use the feedback information channel indicated by the physical control channel whose downlink assignment index equals 1 as the second feedback information channel for sending the feedback information after filling.

For the operations and functions executed by hardware or a combination of hardware and corresponding software in the user equipment 1100, refer to 410, 420, and 430 in the foregoing method in Embodiment 3, which is not elaborated here to avoid repetition.

In addition, a computer readable media (or medium) is further provided, which includes computer readable instructions that execute, when being run, the following operations: the operations of 410, 420, and 430 in the foregoing method in Embodiment 3.

In addition, a computer program product is further provided, which includes the foregoing computer readable medium.

Embodiment 11

Figure 12:
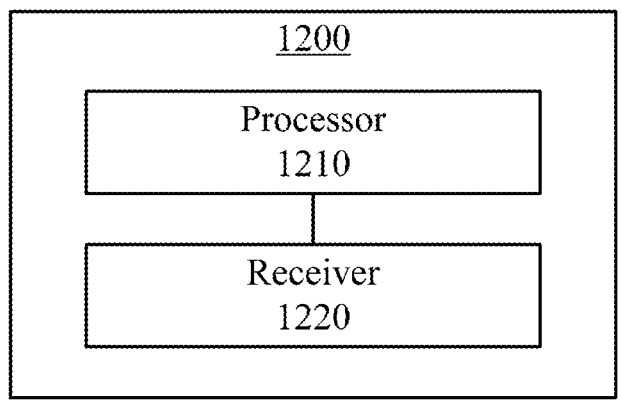
FIG. 12 is a schematic structural diagram of a base station according to Embodiment 11 of the present invention.

FIG. 12 is a schematic structural diagram of a base station 1200 according to Embodiment 11 of the present invention. The base station 1200 includes: a processor 1210 and a receiver 1220.

The receiver 1220 is configured to receive mapping information of first indication information and second indication information in a same uplink subframe of a primary cell.

The processor 1210 is configured to obtain the first indication information and the second indication information according to the mapping information; determine feedback information corresponding to the first number of downlink subframes of the primary cell according to the first indication information, determine feedback information corresponding to the first number of downlink subframes of a secondary cell according to the second indication information, and remove filled information from the feedback information corresponding to the first number of downlink subframes of the primary cell according to the number of feedback information bits of the primary cell that needs to be sent in the uplink subframe and the first number, so as to determine the feedback information of the primary cell that needs to be sent in the uplink subframe, and/or remove filled information from the feedback information corresponding to the first number of downlink subframes of the secondary cell according to the number of feedback information bits of the secondary cell that needs to be sent in the uplink subframe and the first number, so as to determine the feedback information of the secondary cell that needs to be sent in the uplink subframe.

In the embodiment of the present invention, filling can be performed on feedback information for each cell that needs to send feedback information in an uplink subframe of the primary cell, so that the feedback information of each cell may also be processed by adopting a consistent method, so as to implement sending feedback information when cells have different uplink and downlink configurations.

In the embodiment of the present invention, the first number equals the maximum value of the number of downlink subframes of the primary cell and the secondary cell whose feedback information needs to be sent in the uplink subframe.

Optionally, as a supplement or an exception, the first number is the size of a binding window in the configured timing relationship of feedback information, the first number is greater than the number of downlink subframes of the primary cell whose feedback information needs to be sent in the uplink subframe, and the first number is greater than the number of downlink subframes of the secondary cell whose feedback information needs to be sent in the uplink subframe.

Optionally, as a supplement or an exception, the processor 1210 is configured to sort the feedback information of the cell in the primary cell and the secondary cell whose feedback information is to be filled; when the first feedback information in the feedback information of the cell whose feedback information is to be filled is acknowledgment information, fill a piece of acknowledgment information before the first feedback information, so as to determine the feedback information after filling; or when the first feedback information is negative acknowledgment information or discontinuous transmission information, fill a piece of discontinuous transmission information before the first feedback information, so as to determine the feedback information after filling.

Optionally, as a supplement or an exception, the receiver 1220 uses, when a semi-statically scheduled service exists, the feedback information channel indicated by the physical control channel whose downlink assignment index equals 1 as the first feedback information channel for sending the feedback information after filling, and uses the semi-statically scheduled feedback information channel as the second feedback information channel for receiving the feedback information after filling; when a semi-statically scheduled service does not exist, uses the feedback information channel indicated by the physical control channel whose downlink assignment index equals 2 as the first feedback information channel for receiving the feedback information after filling, and uses the feedback information channel indicated by the physical control channel whose downlink assignment index equals 1 as the second feedback information channel for receiving the feedback information after filling.

For the operations executed by hardware or a combination of hardware and corresponding software in the base station 1200, refer to 510, 520, and 530 in the foregoing method in Embodiment 4, which is not elaborated here to avoid repetition.

In addition, a computer readable media (or medium) is further provided, which includes computer readable instructions that execute, when being run, the following operations: the operations of 510, 520, and 530 in the foregoing method in Embodiment 3.

In addition, a computer program product is further provided, which includes the foregoing computer readable medium.

Embodiment 12

Embodiment 12 provides a communications system, which includes the user equipment 900 in Embodiment 8 and the base station 1000 in Embodiment 9. As an option or exception, Embodiment 12 further provides another communications system, which includes the user equipment 1100 in Embodiment 10 and the base station 1200 in Embodiment 11.

It should be noted that "first" and "second" mentioned in all the embodiments of the present invention are only used for differentiation rather than to represent the meanings in terms of time sequence or sizes. In addition, the indication information (including the first indication information and the second indication information) mentioned in the embodiments of the present invention may be several pieces of feedback information of each downlink subframe of a primary cell or a secondary cell that needs to be sent in a same uplink subframe of the primary cell (for example, two pieces of feedback information, ACK, ACK), may further be several bits obtained after space binding and/or time binding is performed on the feedback information of each downlink subframe of the primary cell or the secondary cell that needs to be sent in a same uplink subframe of the primary cell (for example, two bits, A, A). The mapping information of the first indication information and the second indication information mentioned in the embodiments of the present invention is several bits obtained according to the first indication information and the second indication information based on a channel selection mapping table or based in physical uplink shared channel format 3 or based on other mapping rules (for example, two bits, 1, 1).

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Persons skilled in the art can clearly understand that, for convenience and simplicity of description, the specific work process of the systems, devices, and units described above can be referred to the corresponding process in the aforementioned method embodiments, which are no longer repeated here.

In the embodiments provided by the present application, it should be understood that the systems, devices, and methods disclosed may be implemented in other forms. For example, the device embodiments described above are merely exemplary. For example, the division of units is merely logical functional division, and there are other division forms in real application. For example, multiple units or components may be combined or be integrated to another system, or some features may be ignored or not be executed. In another aspect, the coupling, direct coupling, or communication connection there between which is displayed or discussed may be indirect coupling or communication connection of interfaces, devices, or units, and may be electrical, mechanical, or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, the functional units in the embodiments of the present invention may either be integrated in one device or unit, or each be a separate physical unit; alternatively, two or more of the units are integrated in one device or unit.

If implemented in the form of software functional units and sold or used as an independent product, the functions may also be stored in a computer readable storage medium. Based on this, the above technical solution or the part that makes contributions to the prior art can be substantially embodied in the form of a software product. The computer software product may be stored in a storage medium and contain several instructions to instruct computer equipment (for example, a personal computer, a server, or network equipment) to perform all or a part of the steps of the method described in the embodiments of the present invention. The storage medium may be any medium that is capable of storing program codes, such as a USB flash drive, a removable hard disk, a Read-Only Memory (ROM, Read-Only Memory), a RAM (RAM, Random Access Memory), a magnetic disk or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing a hybrid automatic repeat request (HARQ) by a mobile device configured with a primary cell and a secondary cell, wherein a number of downlink subframes in a radio frame of the primary cell is $M_1$, the number of downlink subframes in a radio frame of the secondary cell is $M_2$, and $M_1$ and $M_2$ are different positive integers, the method comprising:
   receiving downlink information in $M_1$ downlink subframes of the primary cell and generating feedback information for each of the $M_1$ downlink subframes of the primary cell to obtain $M_1$ pieces of feedback information; and
   receiving downlink information in $M_2$ downlink subframes of the secondary cell and generating feedback information for each of the $M_2$ downlink subframes of the secondary cell to obtain $M_2$ pieces of feedback information;
   when $M_2$ is less than $M_1$,
   increasing a number of pieces of feedback information of the secondary cell to $M_1$ by adding $M_1-M_2$ pieces of feedback information that are set to discontinuous transmission (DTX) after generating feedback information for each of the $M_2$ downlink subframes of the secondary cell, so as to obtain $M_1$ pieces of feedback information of the secondary cell;
   determining first bits according to mapping between the first bits and a first combination of the $M_1$ pieces of feedback information of the primary cell and the $M_1$ pieces of feedback information of the secondary cell; and
   sending the first bits in an uplink subframe of the primary cell based on a channel selection mapping table; and
   when $M_1$ is less than $M_2$,
   increasing a number of pieces of feedback information of the primary cell to $M_2$ by adding $M_2-M_1$ pieces of feedback information that are set to DTX after generating feedback information for each of the $M_1$ downlink subframes of the primary cell, so as to obtain $M_2$ pieces of feedback information of the primary cell;
   determining second bits according to mapping between the second bits and a second combination of the $M_2$ pieces of feedback information of the primary cell and the $M_2$ pieces of feedback information of the secondary cell; and
   sending the second bits in the uplink subframe of the primary cell based on the channel selection mapping table;
   wherein the feedback information includes ACK, NACK or DTX, the first combination includes a sequence formed by the $M_1$ pieces of feedback information of the primary cell in front followed by the $M_1$ pieces of feedback information of the secondary cell in the back, and the second combination includes a sequence formed by the $M_2$ pieces of feedback information of the primary cell in front followed by the $M_2$ pieces of feedback information of the secondary cell in the back.

2. A mobile device configured with a primary cell and a secondary cell, wherein a number of downlink subframes in a radio frame of the primary cell is $M_1$, the number of downlink subframes in a radio frame of the secondary cell is $M_2$, and $M_1$ and $M_2$ are different positive integers, the device comprising:
   a memory for storing computer executable instructions; and
   a processor configured to execute the computer executable instructions to perform operations of:
   receiving downlink information in $M_1$ downlink subframes of the primary cell and generating feedback information for each of the $M_1$ downlink subframes of the primary cell to obtain $M_1$ pieces of feedback information; and
   receiving downlink information in $M_2$ downlink subframes of the secondary cell and generating feedback information for each of the $M_2$ downlink subframes of the secondary cell to obtain $M_2$ pieces of feedback information;
   when $M_2$ is less than $M_1$,
   increasing a number of pieces of feedback information of the secondary cell to $M_1$ by adding $M_1-M_2$ pieces of feedback information that are set to discontinuous transmission (DTX) after generating feedback information for each of the $M_2$ downlink subframes of the secondary cell, so as to obtain $M_1$ pieces of feedback information of the secondary cell;

determining first bits according to mapping between the first bits and a first combination of the $M_1$ pieces of feedback information of the primary cell and the $M_1$ pieces of feedback information of the secondary cell; and sending the first bits in an uplink subframe of the primary cell based on a channel selection mapping table; and when $M_1$ is less than $M_2$, increasing a number of pieces of feedback information of the primary cell to $M_2$ by adding $M_2-M_1$ pieces of feedback information that are set to DTX after generating feedback information for each of the $M_1$ downlink subframes of the primary cell, so as to obtain $M_2$ pieces of feedback information of the primary cell;

determining second bits according to mapping between the second bits and a second combination of the $M_2$ pieces of feedback information of the primary cell and the $M_2$ pieces of feedback information of the secondary cell; and sending the second bits in the uplink subframe of the primary cell based on the channel selection mapping table, wherein the feedback information includes ACK, NACK or DTX, the first combination includes a sequence formed by the $M_1$ pieces of feedback information of the primary cell in front followed by the $M_1$ pieces of feedback information of the secondary cell in the back, and the second combination includes a sequence formed by the $M_2$ pieces of feedback information of the primary cell in front followed by the $M_2$ pieces of feedback information of the secondary cell in the back.

3. A non-transitory computer readable medium comprising computer readable instructions that, when executed by a computer processor of a mobile device configured with a primary cell and a secondary cell, cause the computer processor of the mobile device to implement the following operations:

receiving downlink information in $M_1$ downlink subframes of the primary cell and generating feedback information for each of the $M_1$ downlink subframes of the primary cell to obtain $M_1$ pieces of feedback information; and receiving downlink information in $M_2$ downlink subframes of the secondary cell and generating feedback information for each of the $M_2$ downlink subframes of the secondary cell to obtain $M_2$ pieces of feedback information, wherein $M_1$ is a number of downlink subframes in a radio frame of the primary cell and $M_2$ is a number of downlink subframes in a radio frame of the secondary cell and $M_1$ and $M_2$ are different positive integers;

when $M_2$ is less than $M_1$, increasing a number of pieces of feedback information of the secondary cell to $M_1$ by adding $M_1-M_2$ pieces of feedback information that are set to discontinuous transmission (DTX) after generating feedback information for each of the $M_2$ downlink subframes of the secondary cell, so as to obtain $M_1$ pieces of feedback information of the secondary cell;

determining first bits according to mapping between the first bits and a first combination of the $M_1$ pieces of feedback information of the primary cell and the $M_1$ pieces of feedback information of the secondary cell; and sending the first bits in an uplink subframe of the primary cell based on a channel selection mapping table; and when $M_1$ is less than $M_2$, increasing a number of pieces of feedback information of the primary cell to $M_2$ by adding $M_2-M_1$ pieces of feedback information that are set to DTX after generating feedback information for each of the $M_1$ downlink subframes of the primary cell, so as to obtain $M_2$ pieces of feedback information of the primary cell;

determining second bits according to mapping between the second bits and a second combination of the $M_2$ pieces of feedback information of the primary cell and the $M_2$ pieces of feedback information of the secondary cell; and sending the second bits in the uplink subframe of the primary cell based on the channel selection mapping table;

wherein the feedback information includes ACK, NACK or DTX, the first combination includes a sequence formed by the $M_1$ pieces of feedback information of the primary cell in front followed by the $M_1$ pieces of feedback information of the secondary cell in the back and the second combination includes a sequence formed by the $M_2$ pieces of feedback information of the primary cell in front followed by the $M_2$ pieces of feedback information of the secondary cell in the back.

* * * * *